US012043038B2

(12) United States Patent
Yada

(10) Patent No.: US 12,043,038 B2
(45) Date of Patent: Jul. 23, 2024

(54) NON-TRANSITORY COMPUTER-READABLE STORAGE MEDIUM, MANAGEMENT APPARATUS AND MANAGEMENT METHOD

(71) Applicant: BROTHER KOGYO KABUSHIKI KAISHA, Nagoya (JP)

(72) Inventor: Yuki Yada, Kuwana (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 210 days.

(21) Appl. No.: 17/697,892

(22) Filed: Mar. 17, 2022

(65) Prior Publication Data

US 2022/0203693 A1 Jun. 30, 2022

Related U.S. Application Data

(63) Continuation of application No. PCT/JP2020/031979, filed on Aug. 25, 2020.

(30) Foreign Application Priority Data

Sep. 18, 2019 (JP) ................................ 2019-169415

(51) Int. Cl.
*B41J 2/175* (2006.01)

(52) U.S. Cl.
CPC ....... *B41J 2/17566* (2013.01); *B41J 2/17546* (2013.01); *B41J 2/17553* (2013.01); *B41J 2002/17589* (2013.01)

(58) Field of Classification Search
CPC B41J 2/17566; B41J 2/17546; B41J 2/17553; B41J 2002/17589; B41J 3/46;
(Continued)

(56) References Cited

U.S. PATENT DOCUMENTS 6,330,402 B1 12/2001 Sakurai et al.
6,864,991 B1 3/2005 Takahashi
(Continued)

FOREIGN PATENT DOCUMENTS

JP 2000-71568 A 3/2000
JP 2000-298540 A 10/2000
(Continued)

OTHER PUBLICATIONS

Japanese Office Action for the related Japanese Patent Application No. 2019-169415 dated May 17, 2023.
(Continued)

*Primary Examiner* — Justin Seo
*Assistant Examiner* — Tracey M McMillion
(74) *Attorney, Agent, or Firm* — KENEALY VAIDYA LLP

(57) ABSTRACT

First information about a remaining amount of a first printing material in a first cartridge is acquired, second information about to a remaining amount of a second printing material in a second cartridge is acquired, and display screen data is generated. The display screen data indicates a display screen including a first display image including a first object and a second object for displaying a first value based on the first information and a third object for displaying a second value based on the second information. The first and third objects indicate a value corresponding to a state where a printing material remains in the cartridges, and the second object indicates a value corresponding to remaining of the first printing material in a tank connected to the first cartridge. The first and third objects are displayed in a first area, and the second object is displayed in a second area.

12 Claims, 16 Drawing Sheets

(58) Field of Classification Search
CPC .. B41J 2002/17576; B41J 2/175; G03G 21/00
See application file for complete search history.

(56) References Cited

U.S. PATENT DOCUMENTS

| | | | |
|---|---|---|---|
| 7,283,258 | B1 | 10/2007 | Kuno et al. |
| 2010/0074633 | A1 | 3/2010 | Kuwasaki |
| 2015/0316884 | A1 | 11/2015 | Shinagawa |
| 2019/0034132 | A1 | 1/2019 | Yamada |
| 2019/0193410 | A1 | 6/2019 | Minamikawa et al. |
| 2019/0193411 | A1 | 6/2019 | Minamikawa et al. |
| 2019/0275803 | A1* | 9/2019 | Miyazawa ........... B41J 2/17566 |
| 2019/0291488 | A1 | 9/2019 | Mizuno |

FOREIGN PATENT DOCUMENTS

| | | | |
|---|---|---|---|
| JP | 2001-83846 | A | 3/2001 |
| JP | 2010-79575 | A | 4/2010 |
| JP | 2018-92198 | A | 6/2018 |
| JP | 2019-28756 | A | 2/2019 |
| JP | 2019-116080 | A | 7/2019 |
| JP | 2019-116081 | A | 7/2019 |
| JP | 2019-153256 | A | 9/2019 |
| JP | 2019-162836 | A | 9/2019 |

OTHER PUBLICATIONS

International Search Report for PCT/JP2020/031979 dated Nov. 17, 2020.

International Preliminary Report on Patentability and English language Written Opinion of the International Search Report for PCT/JP2020/031979 dated Mar. 15, 2022.

* cited by examiner

FIG. 4

MANAGEMENT DATABASE

PD

| | SERIAL NUMBER | MODEL NAME | IP ADDRESS | SUPPLY METHOD | TOTAL NUMBER OF PRINTABLE SHEETS TN | NUMBER OF TANK-PRINTABLE SHEETS SN | NUMBER OF REMAINING PRINTABLE SHEETS RN | CARTRIDGE REMAINING PERCENTAGE CR | INTERMEDIATE TANK REMAINING PERCENTAGE SR |
|---|---|---|---|---|---|---|---|---|---|
| EN1 | AAABBB | MDL_200 | IP_A | TWO-CHAMBER | 6000 | 400 | 3000 | 46 | 100 |
| EN2 | CCCDDD | MDL_250 | IP_B | TWO-CHAMBER | 5000 | 500 | 3000 | 56 | 100 |
| EN3 | GGGHHH | MDL_500 | IP_C | ONE-CHAMBER | 4000 | – | 3200 | 80 | – |
| EN4 | JJJKKK | MDL_550 | IP_D | ONE-CHAMBER | 3000 | – | 300 | 10 | – |

PRINTER 100A (FIRST STORAGE STATE S1)

PRINTER 100A (SECOND STORAGE STATE S2)

PRINTER 100C (REMAINING AMOUNT OF CARTRIDGE "LARGE")

NON-TRANSITORY COMPUTER-READABLE STORAGE MEDIUM, MANAGEMENT APPARATUS AND MANAGEMENT METHOD

CROSS-REFERENCE TO RELATED APPLICATION

This is a continuation application of International Application No. PCT/JP2020/031979 filed on Aug. 25, 2020 which claims the benefit of priority from Japanese patent application No. 2019-169415 filed on Sep. 18, 2019. The entire contents of the earlier applications are incorporated herein by reference.

BACKGROUND

It is disclosed that an image forming apparatus displays a display screen including a gauge configured to indicate a remaining amount of toner in a small-capacity cartridge and a gauge configured to indicate a remaining amount of toner in a large-capacity cartridge. On the image forming apparatus, a position on the gauge indicating that the small-capacity cartridge is empty and a position on the gauge indicating that the remaining amount in the large-capacity cartridge is empty are aligned.

However, the technology for the above-described apparatus does not take into account at all a structure configured to mount the cartridge and to supply a printing material (for example, ink or toner) to a print execution unit. For example, depending on the structure configured to supply the printing material, the timing of ordering or replacing the cartridge at the time when the printing material is reduced may differ. For this reason, when managing a plurality of print execution units including models with different structures configured to supply the printing material, it is difficult to perceive, on a display screen, the timing of ordering or replacing the cartridge, and the convenience for a user of the display screen may be lowered.

SUMMARY

An object of the present disclosure is to provide a technology that improves convenience for a user of a display screen configured to display index values pertaining to remaining amounts of printing materials for a plurality of print execution units.

The technology disclosed in the present disclosure can be implemented as following aspects.

A first aspect of the present disclosure is a non-transitory computer-readable storage medium storing a computer program. The computer program is executed by a computer. The computer program causes the computer to perform acquiring first information pertaining to a remaining amount of a first printing material in a first cartridge which is mounted to a first supply unit configured to supply the first printing material to a first print execution unit. The first supply unit has a tank configured to store the first printing material supplied from the first cartridge mounted to the first supply unit, and is configured to supply the first printing material stored in the tank to the first print execution unit. The computer program causes the computer to perform acquiring second information pertaining to a remaining amount of a second printing material in a second cartridge which is mounted to a second supply unit configured to supply the second printing material to a second print execution unit. The second supply unit does not have the tank. The computer program causes the computer to perform generating display screen data indicating a display screen including a first display image for displaying a first value determined using the first information and a second display image for displaying a second value determined using the second information. The first value is an index value pertaining to the remaining amount of the first printing material. The second value is an index value pertaining to the remaining amount of the second printing material. The computer program causes the computer to perform outputting the display screen data. The first display image includes a first object and a second object. The first object indicates a value, which corresponds to a first state where the first printing material remains in the first cartridge and the first printing material remains in the tank, out of values which enable to be taken by the first value. The second object indicates a value, which corresponds to a second state where the first printing material does not remain in the first cartridge and the first printing material remains in the tank, out of the values which enable to be taken by the first value. The second display image includes a third object. The third object indicates the second value corresponding to a state where the second printing material remains in the second cartridge. The display screen includes a first area having a plurality of display fields aligned along a first direction which is one of a lateral direction and a vertical direction, and a second area different from the first area in terms of position in a second direction, which is the other of the lateral direction and the vertical direction and having a plurality of display fields aligned along the first direction. The first object is displayed in a display field, which corresponds to the first print execution unit, in the first area. The second object is displayed in a display field, which corresponds to the first print execution unit, in the second area. The third object is displayed in a display field, which corresponds to the second print execution unit, in the first area.

A second aspect of the present disclosure is a management apparatus for a plurality of print execution units. The management apparatus includes a first acquisition unit, a second acquisition unit, a generation unit and an output unit. The first acquisition unit is configured to acquire first information pertaining to a remaining amount of a first printing material in a first cartridge which is mounted to a first supply unit configured to supply the first printing material to a first print execution unit. The first supply unit has a tank configured to store the first printing material is supplied from the first cartridge mounted to the first supply unit, and is configured to supply the first printing material stored in the tank to the first print execution unit. The second acquisition unit is configured to acquire second information pertaining to a remaining amount of a second printing material in a second cartridge which is mounted to a second supply unit configured to supply the second printing material to a second print execution unit. The second supply unit does not have the tank. The generation unit is configured to generate display screen data indicating a display screen including a first display image for displaying a first value determined using the first information and a second display image for displaying a second value determined using the second information. The first value is an index value pertaining to the remaining amount of the first printing material. The second value is an index value pertaining to the remaining amount of the second printing material. The output unit is configured to output the display screen data. The first display image includes a first object and a second object. The first object indicates a value, which corresponds to a first state where the first printing material remains in the first cartridge and the first printing material remains in the tank, out of values which enables to be taken by the first value. The second object indicates a value, which corresponds to a second state where the first printing material does not remain in the first cartridge and the first printing material remains in the tank, out of the values which enables to be taken by the first value. The second display image includes a third object. The third object indicates the second value corresponding to a state where the second printing material remains in the second cartridge. The display screen includes a first area having a plurality of display fields aligned along a first direction, which is one of a lateral direction and a vertical direction, and a second area different from the first area in terms of position in a second direction, which is the other of the lateral direction and the vertical direction, and having a plurality of display fields aligned along the first direction. The first object is displayed in a display field, which corresponds to the first print execution unit, in the first area. The second object is displayed in a display field, which corresponds to the first print execution unit, in the second area. The third object is displayed in a display field, which corresponds to the second print execution unit, in the first area.

A third aspect of the present disclosure is a management method for a plurality of print execution units. The management method including:

- a first acquisition step of acquiring first information pertaining to a remaining amount of a first printing material of a first cartridge which is mounted to a first supply unit configured to supply the first printing material to a first print execution unit, the first supply unit having a tank configured to store the first printing material, which is supplied from the first cartridge mounted to the first supply unit, and being configured to supply the first printing material stored in the tank to the first print execution unit:
- a second acquisition step of acquiring second information pertaining to a remaining amount of a second printing material of a second cartridge which is mounted to a second supply unit configured to supply the second printing material to a second print execution unit, the second supply unit not having the tank;
- a generation step of generating display screen data indicating a display screen including a first display image for displaying a first value determined using the first information and a second display image for displaying a second value determined using the second information, the first value being an index value pertaining to the remaining amount of the first printing material and the second value being an index value pertaining to the remaining amount of the second printing material; and
- an output step of outputting the display screen data.

The first display image includes a first object and a second object. The first object indicates a value, which corresponds to a first state where the first printing material remains in the first cartridge and the first printing material remains in the tank, out of values which enable to be taken by the first value. The second object indicates a value, which corresponds to a second state where the first printing material does not remain in the first cartridge and the first printing material remains in the tank, out of the values which enable to be taken by the first value. The second display image includes a third object. The third object indicates the second value corresponding to a state where the second printing material remains in the second cartridge. The display screen includes a first area having a plurality of display fields aligned along a first direction which is one of a lateral direction and a vertical direction, and a second area different from the first area in terms of position in a second direction, which is the other of the lateral direction and the vertical direction, and having a plurality of display fields aligned along the first direction. The first object is displayed in a display field, which corresponds to the first print execution unit, in the first area. The second object is displayed in a display field, which corresponds to the first print execution unit, in the second area. The third object is displayed in a display field, which corresponds to the second print execution unit, in the first area.

According to the above-described configuration of the first to third aspects, the first object and the third object indicative of the value corresponding to the state where the printing material remains in the cartridge are displayed in the first area, and the second object indicative of the value corresponding to the second state where the first printing material does not remain in the first cartridge and the first printing material also remains in the tank is displayed in the second area. As a result, depending on the area in which the object is displayed, it is possible to easily perceive whether the object indicates the value corresponding to the state where the printing material remains in the cartridge or the value corresponding to the state where the printing material does not remain in the cartridge and the printing material also remains in the tank. Therefore, it is possible to improve convenience for a user of the display screen configured to display the index values pertaining to the remaining amounts of the printing materials for the plurality of print execution units.

Note that, the technology disclosed in the disclosure can be realized in various forms, for example, in forms of the management apparatus for the printing execution units, a terminal device, the management method for the print execution units, a computer program for implementing functions of the apparatus and method, the non-transitory computer-readable storage medium storing the computer program, and the like.

BRIEF DESCRIPTION OF DRAWINGS

FIG. 4 shows an example of a management database PD of an example.

DETAILED DESCRIPTION

A. Example

A-1. Configuration of System 1000

Figure 1A:
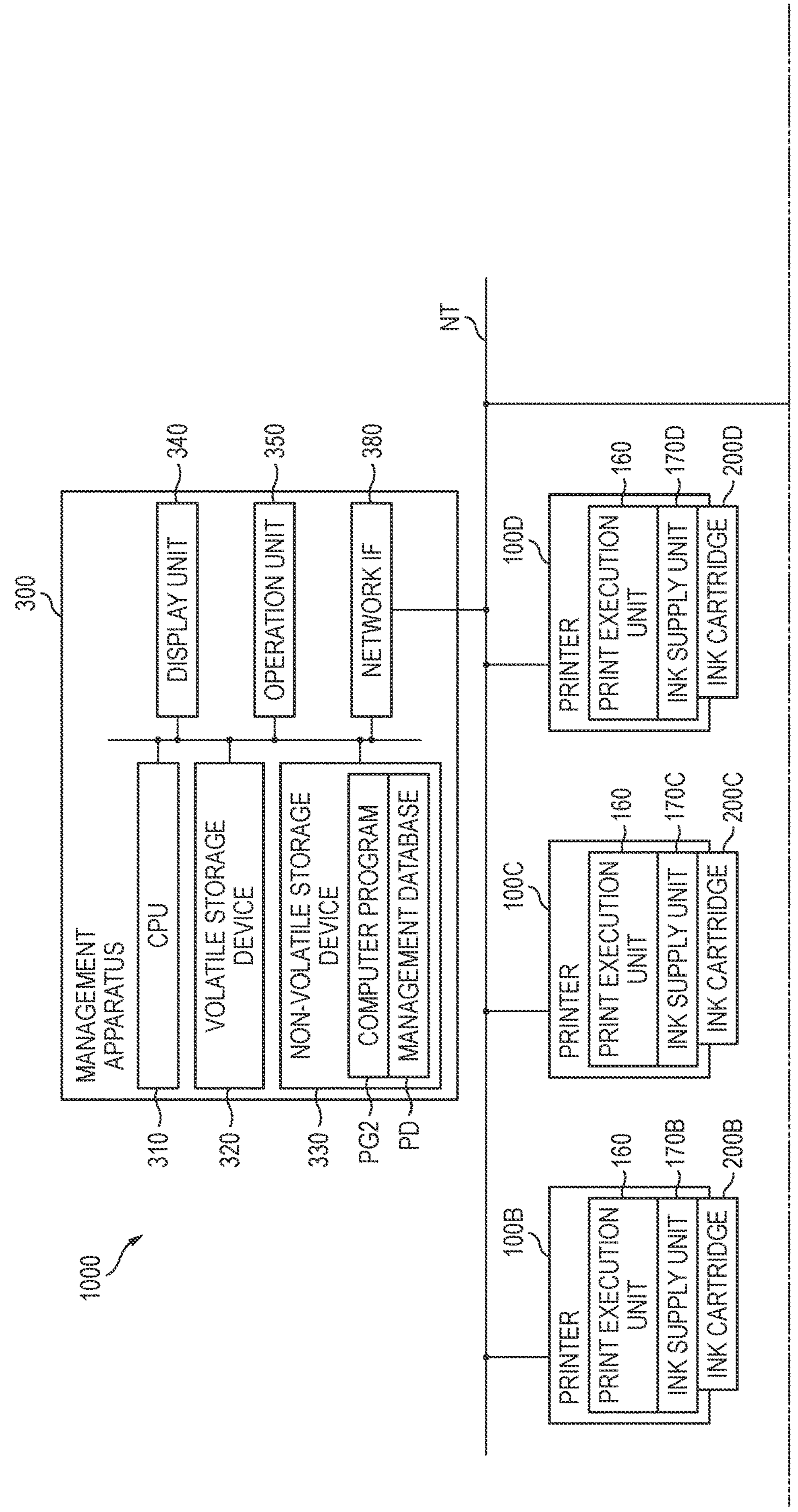
FIGS. 1A and 1B are block diagrams showing a configuration of a system 1000.
Figure 1B:
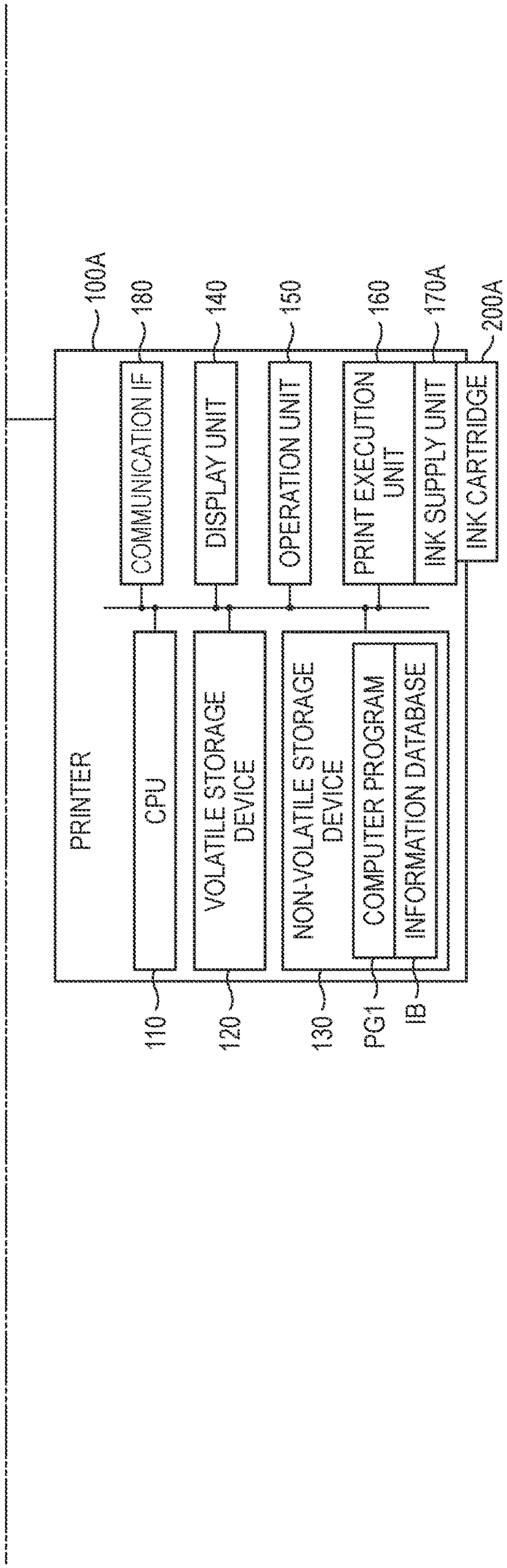

FIGS. 1A and 1B are block diagrams showing a configuration of a system 1000. The system 1000 includes printers 100A to 100D and a management apparatus 300 of the present example. The printers 100A to 100D and the management apparatus 300 are connected to a local area network NT and can communicate with each other via the local area network NT.

The printer 100A includes a CPU 110 as a controller of the printer 100A, a volatile storage device 120 such as a DRAM, a non-volatile storage device 130 such as a hard disk and a flash memory, a display unit 140 such as a liquid crystal monitor configured to display an image, an operation unit 150 such as a button and a touch panel for acquiring a user operation, a print execution unit 160, an ink supply unit 170A, and a communication interface (IF) 180.

The communication IF 180 is an interface for connecting to the local area network NT. Specifically, the communication IF 180 is a wired interface conforming to Ethernet (registered trademark) or a wireless interface conforming to Wi-Fi standards (802.11 standards of IEEE (abbreviation of the Institute of Electrical and Electronics Engineers, Inc.) or standards (for example, 802.11a, 11b, 11g, 11n, and the like) that follow the same).

The CPU 110 is a processing unit (processor) configured to perform data processing. The volatile storage device 120 provides a buffer area configured to temporarily store various intermediate data that is generated at the time when the CPU 110 performs processing. In the non-volatile storage device 130, a computer program PG1 for controlling the printer, and an information database IB, which will be described later, are stored.

In the present example, the computer program PG1 may be provided stored in advance in the non-volatile storage device 130 during manufacturing of the printer 100A. Instead of this, the computer program PG1 may also be provided, for example, in a form of being downloaded from a server connected via the Internet IT, or in a form of being recorded in a CD-ROM or the like.

The CPU 110 is configured to execute printing processing of running the computer program PG1 to control the print execution unit 160, thereby causing the print execution unit 160 to print an image. In addition, the CPU 110 is configured to run the computer program PG1, thereby transmitting various printer information pertaining to the printer 100A stored in the information database IB to the management apparatus 300, in response to a request from the management apparatus 300.

Figure 2A:
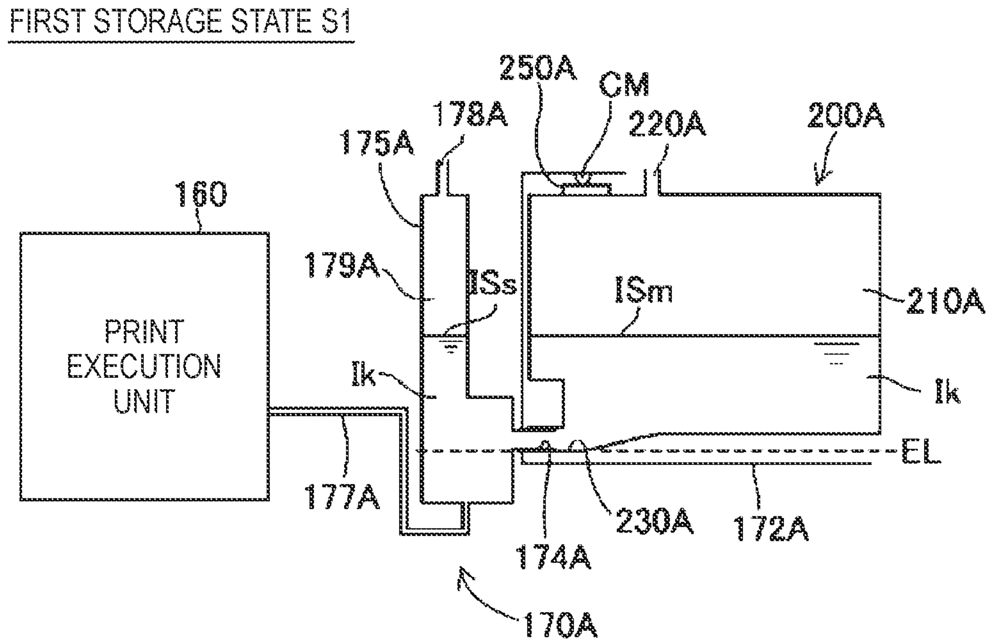
FIGS. 2A and 2B show a schematic view showing configurations of a print execution unit 160 and an ink supply unit 170A.
Figure 2B:
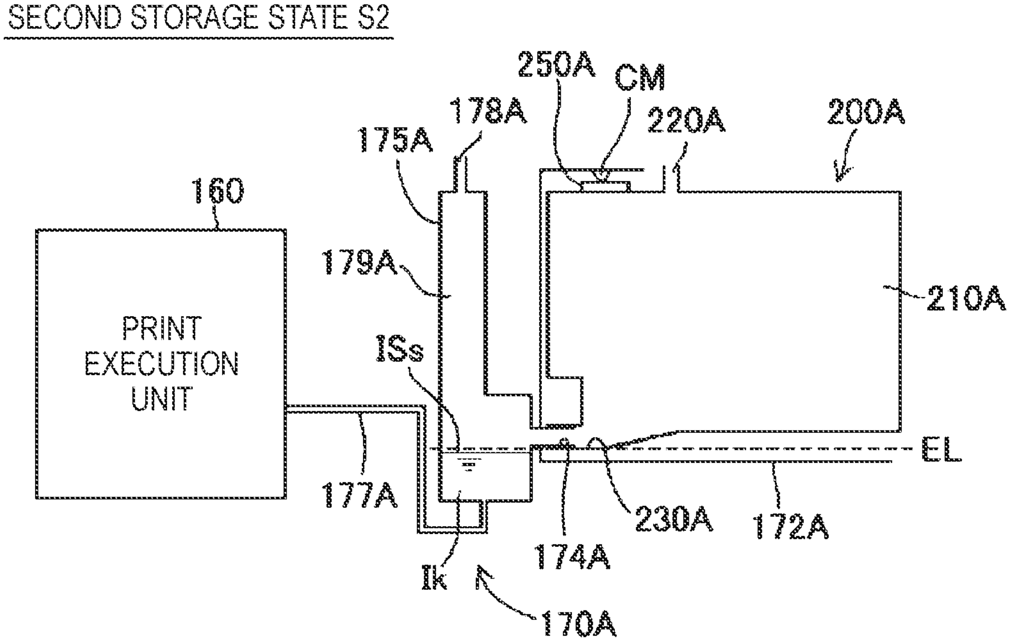

The print execution unit 160 is configured to execute printing, under control of the CPU 110. The ink supply unit 170A is configured to supply ink Ik as a printing material to the print execution unit 160. FIGS. 2A and 2B show a schematic view showing configurations of the print execution unit 160 and the ink supply unit 170A.

The print execution unit 160 is an inkjet-type printing mechanism configured to print an image on a sheet as a printing medium with using the ink Ik supplied from an ink cartridge 200A as a printing material. Specifically, the print execution unit 160 is configured to form an image on a sheet by ejecting the ink Ik from nozzles of a print head (not shown) to form dots on the sheet. In the present example, the print execution unit 160 is a monochrome printing mechanism in which a single-color ink Ik (for example, black (K)) is used.

As shown in FIGS. 2A and 2B, the ink supply unit 170A has a mounting part 172A to which the ink cartridge 200A is mounted, an ink supply port 174A, an intermediate tank 175A and an ink flow path part 177A.

The ink cartridge 200A is formed with a main storage chamber 210A configured to store the ink Ik, a communication port 220A, and an ink outlet 230A. The communication port 220A is an opening configured to communicate the main storage chamber 210A and an outside air each other. The ink outlet 230A is an opening for supplying the ink Ik in the main storage chamber 210A to the ink supply unit 170A. The ink outlet 230A is provided near a lower end of the main storage chamber 210A in a vertical direction so as to allow all the ink Ik in the main storage chamber 210A to be supplied to the ink supply unit 170A.

The ink cartridge 200A has an IC chip 250A attached on an outer surface. In a memory of the IC chip 250A, various information pertaining to the ink cartridge 200A is stored. In the present example, the information stored in the memory of the IC chip 250A includes a total number of printable sheets TN and identification information (for example, a serial number) for identifying the ink cartridge 200A. The total number of printable sheets TN is a number of prints that can be printed with using an amount (initial amount) of the ink Ik stored in the brand-new ink cartridge 200A. The total number of printable sheets TN can also be said as a value indicative of the initial amount of the ink IK in the ink cartridge 200A, in a unit of a number of printed sheets. The total number of printable sheets TN is, for example, a value obtained by dividing the initial amount of the ink Ik in the ink cartridge 200A by an amount of ink used per one average print.

The mounting part 172A is, for example, a holder that can detachably mount the ink cartridge 200A. The ink supply port 174A is configured to communicate with the ink outlet 230A of the ink cartridge 200A mounted to the mounting part 172A. The ink Ik in the main storage chamber 210A is supplied from the ink supply port 174A to the ink supply unit 170A. The mounting part 172A has a contact point CM configured to contact an electrode of the IC chip 250A of the ink cartridge 200A mounted to the mounting part 172A via the contact point CM, the printer 100A (CPU 110) can read out the information stored in the memory of the IC chip 250A and write information to the memory.

The intermediate tank 175A is formed with a sub-storage chamber 179A configured to store the ink Ik, and a communication port 178A. The communication port 178A is an opening configured to communicate the sub-storage chamber 179A and an outside air each other. The sub-storage chamber 179A is configured to communicate with the ink supply port 174A and to store the ink Ik supplied from the ink cartridge 200A via the ink supply port 174A.

An upstream end of the ink flow path part 177A is connected near a bottom surface of the sub-storage chamber 179A of the intermediate tank 175A and is configured to communicate with the sub-storage chamber 179A. A downstream end of the ink flow path part 177A is connected to a print head (not shown) of the print execution unit 160. Thereby, the ink Ik stored in the sub-storage chamber 179A is supplied to the print execution unit 160 via the ink flow path part 177A.

As can be seen from the above descriptions, the intermediate tank 175A is arranged on a flow path of the ink Ik ranging from the ink cartridge 200A mounted to the mounting part 172A to the print execution unit 160.

Here, like the ink supply unit 170A of the printer 100A, a supply method of the ink Ik of a type having an intermediate tank on a path of the ink Ik ranging from an ink cartridge to a printing mechanism is referred to as a two-chamber supply method. FIG. 2A shows the ink supply unit 170A in a first storing state S1 where the ink Ik remains in the ink cartridge 200A (in the main storage chamber 210A) and the ink Ik also remains in the intermediate tank 175A (in the sub-storage chamber 179A). FIG. 2B shows the ink supply unit 170A in a second storing state S2 where the ink Ik does not remain in the ink cartridge 200A (in the main storage chamber 210A) and the ink Ik also remains in the intermediate tank 175A (in the sub-storage chamber 179A).

The main storage chamber 210A of the ink cartridge 200A is configured to communicate with the outside by the communication port 220A, and the sub-storage chamber 179A of the intermediate tank 175A is configured to communicate with the outside by the communication port 178A. The sub-storage chamber 179A of the intermediate tank 175A includes a part located (on a lower side in FIGS. 2A and 2B) vertically below a lower end (hereinafter, simply referred to as 'lower end') in a vertical direction of the main storage chamber 210A of the ink cartridge 200A and a part located vertically above the lower end in the vertical direction of the main storage chamber 210A. Therefore, when a brand-new ink cartridge 200A is mounted, some of the ink Ik in the ink cartridge 200A moves from the ink supply port 174A into the sub-storage chamber 179A. A liquid level ISm of the ink Ik in the main storage chamber 210A and a liquid level ISs of the ink Ik in the sub-storage chamber 179A match in terms of height (FIG. 2A).

When printing is performed by the print execution unit 160 and therefore the ink Ik is consumed, the liquid levels ISm and ISs descend while maintaining the state where the two liquid levels ISm and ISs match. When the liquid levels ISm and ISs reach a position EL (also called an empty level EL) of the lower end of the main storage chamber 210A of the ink cartridge 200A, the ink Ik in the main storage chamber 210A of the ink cartridge 200A does not remain, and the storage state of the ink Ik transits from the first storage state S1 (FIG. 2A) to the second storage state S2 (FIG. 2B). Here, a state where the ink Ik in the main storage chamber 210A of the ink cartridge 200A does not remain means a state where the ink Ik no longer moves from the main storage chamber 210A to the sub-storage chamber 179A, and includes a state where some ink Ik is attached on an inner wall of the main storage chamber 210A.

Even after the transition to the second storage state S2, the print execution unit 160 can continue printing as long as the ink Ik remains in the sub-storage chamber 179A. When the ink cartridge 200A is replaced after the transition to the second storage state S2, the ink cartridge 200A can be replaced in the state where the ink Ik does not remain in the ink cartridge 200A, so that waste of the ink Ik does not occur. The advantage of the two-chamber supply method is that printing can be continuously performed and the ink cartridge 200A can be replaced without wasting the ink Ik.

In the two-chamber supply method, as an example, the intermediate tank 175A is provided with a liquid level sensor (not shown) configured to detect whether the liquid level ISs of the ink Ik in the sub-storage chamber 179A has reached the empty level EL. Thereby, it is possible to detect whether the ink Ik remains in the ink cartridge 200A. As the liquid level sensor, for example, a configuration including a float having a lower specific gravity than the ink Ik is adopted. In this configuration, when the liquid level ISs reaches the empty level EL, a position of the float moves downward vertically, and it is detected whether the liquid level ISs of the ink Ik has reached the empty level EL by detecting movement of the float. In other words, the liquid level sensor is a sensor configured to detect whether the storage state of the ink is the first storage state S1 or the second storage state S2. As for the liquid level sensor, another known method, for example, a method of measuring an electrical resistance of the ink Ik may be adopted. In the two-chamber supply method, it is not necessary to provide the ink cartridge 200A with a liquid level sensor, which has the advantage capable of simplifying the configuration of the ink cartridge 200A.

Here, an amount of ink corresponding to a boundary between the first storage state S1 and the second storage state S2 is also referred to as a boundary ink amount. In the present example, the boundary ink amount can also be referred to as an amount of ink in the sub-storage chamber 179A at the time when the liquid level ISs in the sub-storage chamber 179A is located at the empty level EL. The boundary ink amount can also be referred to as a maximum amount of ink in the second storage state S2. Furthermore, the boundary ink amount is the same as a capacity of the part of the sub-storage chamber 179A, which is located vertically below the lower end in the vertical direction of the main storage chamber 210A. A number of prints that can be printed using the boundary ink amount of the ink Ik, i.e., a number of prints that can be printed using the ink Ik remaining in the intermediate tank 175A after the transition to the second storage state S2 is referred to as 'number of tank-printable sheets SN'. The number of tank-printable sheets SN can also be called a value indicative of the boundary ink amount in a unit of the number of printed sheets. The boundary ink amount and the number of tank-printable sheets SN are values depending on a structure and a size of the intermediate tank 175A, and are values specific to each printer model.

The information database IB is a database in which printer information pertaining to the printer 100A is stored. The printer information includes, for example, information indicative of a serial number and a model name. The printer information includes, for example, ink information pertaining to the ink Ik and history information pertaining to a printing history. The ink information includes, for example, the above-described total number of printable sheets TN, the above-described number of tank-printable sheets SN, and a number of remaining printable sheets RN. The total number of printable sheets TN is acquired, for example, from the memory of the IC chip 250A of the ink cartridge 200A. The number of remaining printable sheets RN is a number of prints that can be printed using the ink Ik remaining in the ink cartridge 200A and the intermediate tank 175A. For example, the number of remaining printable sheets RN is a number of sheets obtained by subtracting a number of cumulative printed sheets after replacement of the ink cartridge 200A from the total number of printable sheets TN (RN=TN−SN).

The printer 100A (CPU 110) is configured to keep the printer information stored in the information database IB to the latest information by updating the history information and the ink information stored in the information database IB each time printing is performed, for example. For example, the number of remaining printable sheets RN stored in the information database IB is updated by the printer 100A each time printing is executed in the printer 100A, for example.

The printer 100B has an ink supply unit 170B (FIG. 1A) different from the ink supply unit 170A of the printer 100A. The other configurations of the printer 100B are the same as those of the printer 100A. Similar to the ink supply unit 170A of FIGS. 2A and 2B, as for the ink supply unit 170B, a two-chamber supply method where an intermediate tank is provided on a path of the ink Ik ranging from an ink cartridge to a printing mechanism is adopted (not shown). However, a capacity of the intermediate tank (sub-storage chamber) of the ink supply unit 170B is different from the capacity of the intermediate tank 175A of the ink supply unit 170A. Therefore, the number of tank-printable sheets SN of the printer 100B is different from the number of tank-printable sheets SN of the printer 100A.

The printer 100C has an ink supply unit 170C different from the ink supply unit 170A of the printer 100A. The other configurations of the printer 100C are the same as those of the printer 100A. Unlike the ink supply unit 170A of FIGS. 2A and 2B, as for the ink supply unit 170C, one-chamber supply method where an intermediate tank is not provided on a path of the ink Ik ranging from an ink cartridge 200C to a printing mechanism is adopted.

Figure 3A:
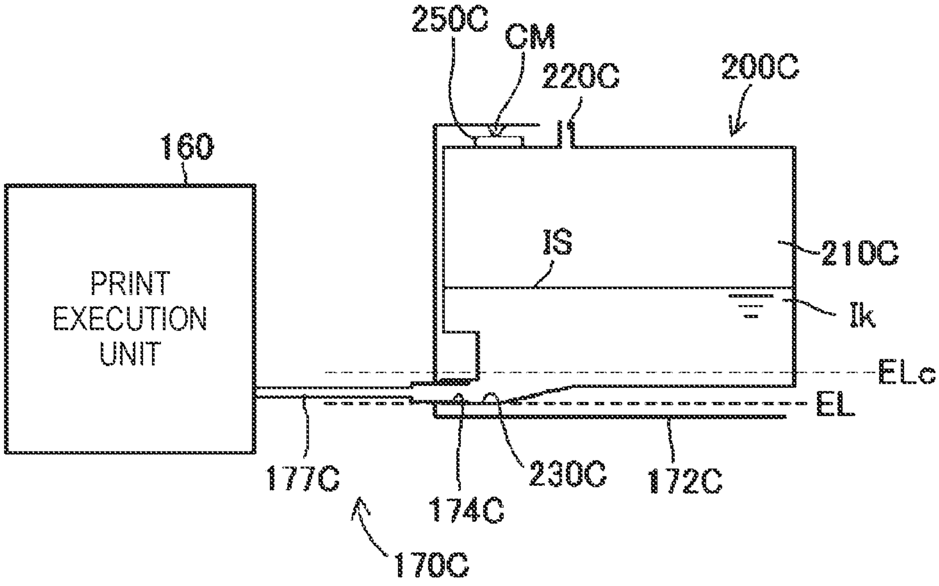
FIGS. 3A and 3B show a schematic view showing configurations of a print execution unit 160 and an ink supply unit 170C.
Figure 3B:
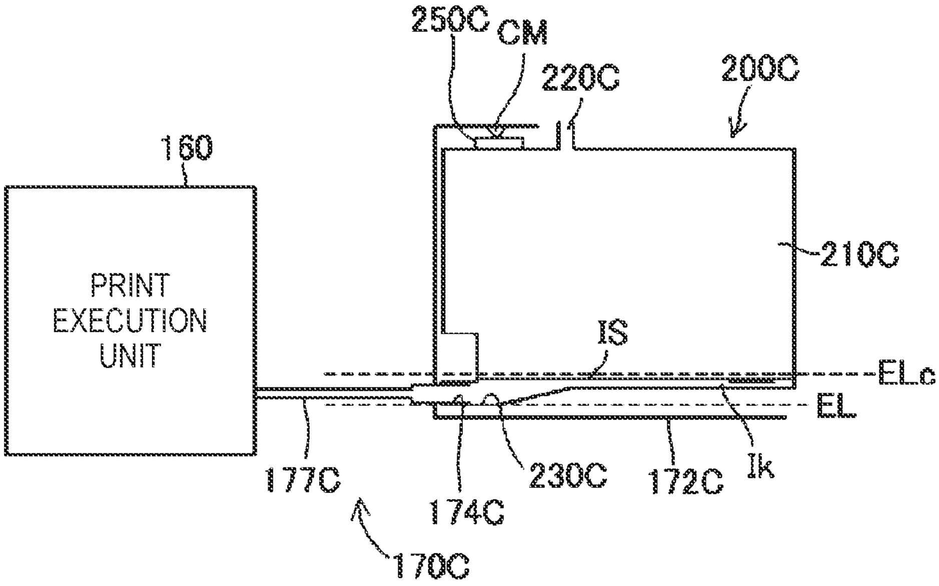

FIGS. 3A and 3B show a schematic view showing configurations of the print execution unit 160 and the ink supply unit 170C. The ink supply unit 170C includes the above-described inkjet-type print execution unit 160, a mounting part 172C, an ink supply port 174C and an ink flow path part 177C.

Similar to the ink cartridge 200A, the ink cartridge 200C is formed with a storage chamber 210C configured to store the ink Ik, a communication port 220C configured to communicate the storage chamber 210C and the outside air each other, and an ink outlet 230C for supplying the ink Ik to the ink supply unit 170C. Similar to the ink cartridge 200A, the ink cartridge 200C has an IC chip 250C attached on an outer surface.

The mounting part 172C is, for example, a holder that can detachably mount the ink cartridge 200C. The ink supply port 174C is configured to communicate with the ink outlet 230C of the ink cartridge 200C mounted to the mounting part 172C. An upstream end of the ink flow path part 177C is configured to communicate with the ink supply port 174C, and a downstream end of the ink flow path part 177C is connected to a print head (not shown) of the print execution unit 160. Thereby, the ink Ik in the ink cartridge 200C (storage chamber 210C) is supplied to the print execution unit 160 via the ink flow path part 177C.

In the one-chamber supply method, the ink cartridge 200C is provided with a liquid level sensor (not shown) configured to detect whether a liquid level IS of the ink Ik in the storage chamber 210C has reached an empty level ELc.

In the one-chamber supply method, the intermediate tank provided in the two-chamber supply method is not provided, so that the print execution unit 160 cannot execute printing before the ink Ik no longer remains in the ink cartridge 200C. For example, if a remaining amount of the ink Ik in the ink cartridge 200C becomes slight, a malfunction occurs in which the ink Ik that is supplied to the print execution unit 160 is mixed with air. For this reason, in a state where the ink Ik equal to or less than the remaining amount at which such air mixing can occur remains in the ink cartridge 200C, printing by the print execution unit 160 is compelled to be stopped.

Therefore, in the one-chamber supply method, the empty level ELc (FIGS. 3A and 3B) is set higher than the empty level EL (FIGS. 2A, 2B, 3A and 3B) of the ink cartridge 200A in the vertical direction. FIG. 3B shows a state where the liquid level IS of the ink Ik in the ink cartridge 200C has reached the empty level ELc. In this state, a small amount of the ink Ik remains in the ink cartridge 200C (storage chamber 210C). In the one-chamber supply method, for example, in the state where the liquid level IS of the ink Ik in the ink cartridge 200C has reached the empty level ELc, replacement of the ink cartridge 200C is performed.

The configurations of the printer 100D are the same as those of the printer 100C. Therefore, the printer 100D has an ink supply unit 170D (FIG. 1A) having the same structure as the ink supply unit 170C of the printer 100C. That is, for the printer 100D, one-chamber supply method is adopted (not shown), like the printer 100C.

Here, initial amounts of the ink Ik of the ink cartridges 200A to 200D (FIGS. 1A and 1B) mounted to the ink supply units 170A to 170D are different, respectively. For this reason, the total numbers of printable sheets TN of the ink cartridges 200A to 200D are different, respectively.

The management apparatus 300 is a computing machine possessed by an administrator of the printers 100A to 100D. The management apparatus 300 is, for example, a personal computer, and includes a CPU 310 as a controller of the management apparatus 300, a volatile storage device 320 such as a DRAM, a non-volatile storage devices 330 such as a hard disk and a flash memory, a display unit 340 such as a liquid crystal monitor configured to display an image, an operation unit 350 such as a keyboard and a mouse, and a communications interface (IF) 380.

The communication IF 180 is connected to the local area network NT. The communication IF 380 is a wired interface conforming to Ethernet (registered trademark) or a wireless interface conforming to Wi-Fi standards or standards that follow the same, similar to the communications IF 180.

The CPU 310 is a processing unit (processor) configured to perform data processing. The volatile storage device 320 provides a buffer area configured to temporarily store various intermediate data that is generated at the time when the CPU 310 performs processing. In the non-volatile storage device 330, a computer program PG2 and a management database PD are stored.

The computer program PG2 is an application program that is provided, for example, in a form of being downloaded from servers of a business operator who manage the system 1000 and a business operator who manufacture the printers 100A to 100D. Instead of this, the computer program PG2 may also be provided in a form of being recorded on a CD-ROM or the like or may also be provided stored in advance in the non-volatile storage device 330 at the time of manufacturing of the management apparatus 300.

The management apparatus 300 (CPU310) is configured to run the computer program PG2, thereby executing processing pertaining to management of the printers 100A to 100D in the system 1000, which will be described later, for example, screen data generating processing and management screen display processing, which will be described later.

The management database PD is a database in which printer information collected by the management apparatus 300 is recorded. FIG. 4 shows an example of the management database PD of the example. As shown in FIG. 4, the management database PD includes entries EN1 to EN4 corresponding to the printers 100A to 100D of management targets.

The entry EN1 corresponding to the printer 100A includes a plurality of items of the printer information of the printer 100A, for example, a serial number, a model name, an IP address and ink-related information pertaining to the ink Ik. The ink-related information includes, for example, information indicative of the above-described supply method of the ink Ik, the above-described total number of printable sheets TN, the above-described number of tank-printable sheets SN, the above-described number of remaining printable sheets RN, a cartridge remaining percentage CR and an intermediate tank remaining percentage SR.

The serial number is identification information for identifying the printer 100A. The model name is a name referring to a model of the printer 100A. The IP address is an IP address assigned to the printer 100A.

The cartridge remaining percentage CR is a ratio (a unit is %) of the ink Ik remaining in the ink cartridge 200A. Here, in the configuration shown in FIGS. 2A and 2B, when ink remains in the ink cartridge 200A, the ink Ik is also present in a position higher than the empty level EL of the intermediate tank 175A but it is treated as being included in the ink Ik remaining in the ink cartridge 200A. The reason is because the ink Ik present in the intermediate tank 175A makes a sense as a reference of replacement of the ink cartridge when it is expressed as an amount that can be consumed after the ink Ik in the ink cartridge 200A becomes zero (in other words, after transition from the first storage state S1 to the second storage state S2). Therefore, for the printer 100A of the two-chamber supply method, it is assumed that the cartridge remaining percentage CR is calculated using the total number of printable sheets TN, the number of tank-printable sheets SN (the number of sheets that can be printed after the ink Ik in the ink cartridge 200A becomes zero), and the number of remaining printable sheets RN, according to the following equations (1).

$$CR=100\times(RN-SN)/(TN-SN)(\text{if } RN>SN)CR=0(\text{if } RN\leq SN) \quad (1)$$

A case of RN>SN, i.e., a case where the number of remaining printable sheets RN is larger than the number of tank-printable sheets SN is the above-described first storage state S1, and the ink Ik remains in the ink cartridge 200A. (RN−SN) of the numerator indicates the number of sheets that can be printed using the ink Ik remaining in the ink cartridge 200A (including the ink Ik remaining in a position higher than the empty level EL of the intermediate tank 175A). (TN−SN) of the denominator indicates the number of sheets that can be printed using the ink Ik remaining in the ink cartridge 200A at the time when the brand-new ink cartridge 200A is mounted (including the ink Ik remaining in a position higher than the empty level EL of the intermediate tank 175A). A case of RN≤SN, i.e., a case where the number of remaining printable sheets RN is equal to or smaller than the number of tank-printable sheets SN is the above-described second storage state S2, and the ink Ik does not remain in the ink cartridge 200A. Therefore, in the case of RN≤SN, the cartridge remaining percentage CR is 0.

In the example shown in FIGS. 2A and 2B, the intermediate tank remaining percentage SR is a ratio (a unit is %) of the ink Ik remaining in the intermediate tank 175A in a position lower than the empty level EL. The intermediate tank remaining percentage SR is calculated using the number of tank-printable sheets SN and the number of remaining printable sheets RN, according to the following equations (2).

$$SR=100(\text{if } RN>SN),SR=100\times RN/SN(\text{if } RN\leq SN) \quad (2)$$

A case of RN>SN, i.e., a case where the number of remaining printable sheets RN is larger than the number of tank-printable sheets SN is the above-described first storage state S1, and the ink Ik remains in the ink cartridge 200A. Therefore, the intermediate tank remaining percentage SR is 100%. A case of RN≤SN, i.e., a case where the number of remaining printable sheets RN is equal to or smaller than the number of tank-printable sheets SN is the above-described second storage state S2, and the ink Ik remains only in the ink cartridge 175A.

As can be seen from the above descriptions, the cartridge remaining percentage CR and the intermediate tank remaining percentage SR are two index values indicative of the remaining percentage of the ink Ik that is supplied to the printer 100A to which the ink cartridge 200A is mounted.

The entries EN2 to EN4 corresponding to the printers 100B to 100D each include information indicative of the same kinds of items as those of the entry EN1 corresponding to the printer 100A. However, since the printers 100C and 1001D are printers of one-chamber supply method and do not have an intermediate tank, the entries EN3 and EN4 do not include the number of tank-printable sheets SN and the intermediate tank remaining percentage SR. In the printers 100C and 100D of one-chamber supply method, the cartridge remaining percentage CR is calculated using the total number of printable sheets TN and the number of remaining printable sheets RN, according to the following equation (3).

$$CR=RN/TN \quad (3)$$

In the present example, the serial number, the model name, and the IP address of the printer information recorded in the management database PD are acquired by the management apparatus 300 at the start of operation of the system 1000. In the present example, for the acquisition of the information, SNMP (Simple Network Management Protocol) is used. Specifically, the management apparatus 300 is configured to broadcast an SNMP request for searching for printers in the local area network NT into the local area network NT. The printers 100A to 100D are each configured to send a reply including its IP address, in response to the SNMP request. The management apparatus 300 is configured to transmit an SNMP request for requesting transmission of the serial number and the model name to each of the printers 100A to 100D by using the IP addresses received, and to receive the serial numbers and the model names of the printers 100A to 100D, as a response to the SNMP request. The management apparatus 300 is configured to record the serial numbers, the model names and the IP addresses in the management database PD. Thereby, the printers 100A to 100D are registered as printers of management targets.

Among the printer information recorded in the management database PD, the supply method of the ink Ik, the total number of printable sheets TN, the number of tank-printable sheets SN, and the number of remaining printable sheets RN are acquired from the printers 100A to 100D of management targets in screen data generating processing, which will be described later. Among the printer information recorded in the management database PD, the cartridge remaining percentage CR and the intermediate tank remaining percentage SR are calculated by the management apparatus 300 in the screen data generating processing.

A-2. Operations of System 1000

A-2-1. Image Data Generating Processing

Figure 5:
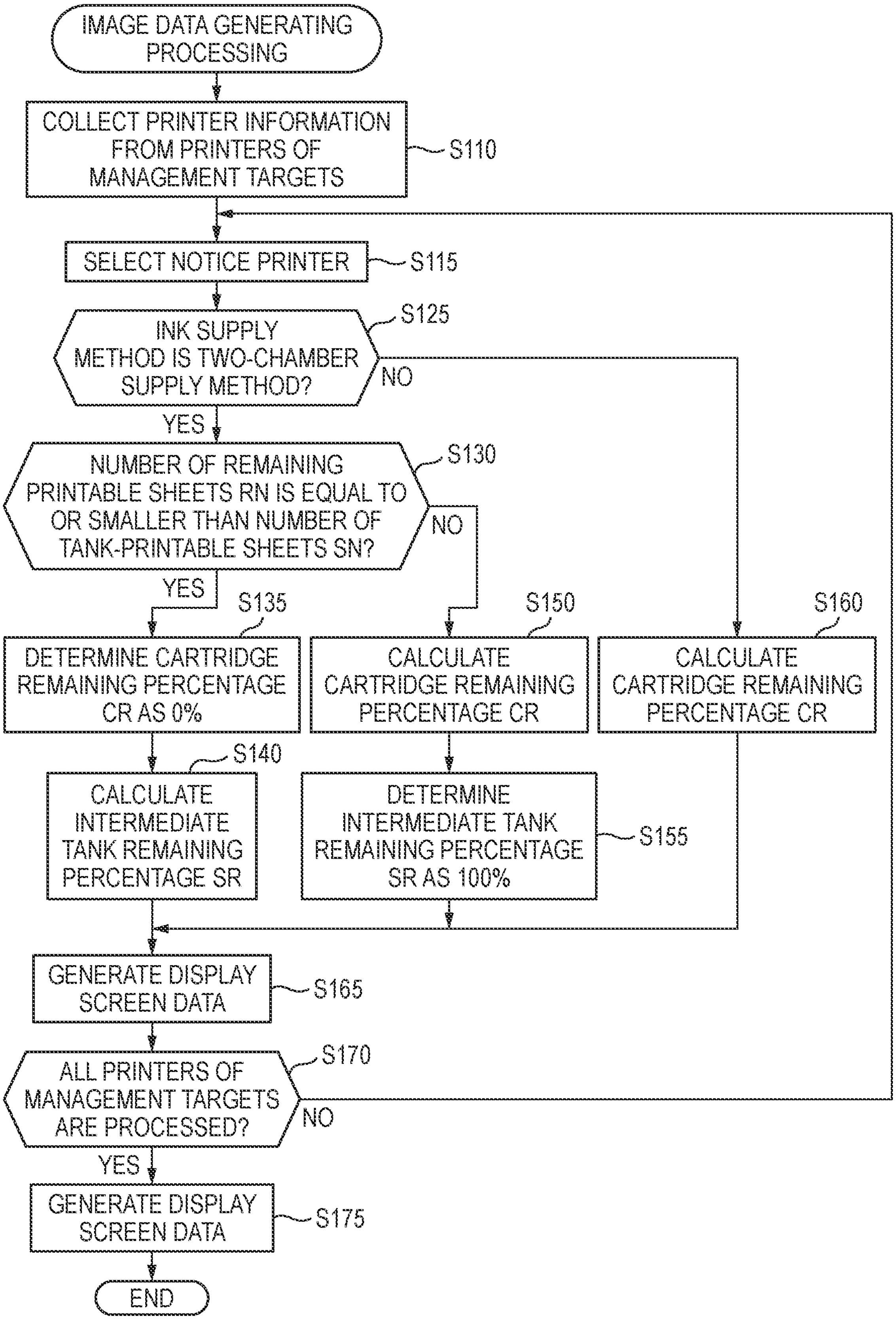
FIG. 5 is a flowchart of screen data generating processing.

The management apparatus 300 (CPU310) is configured to execute screen data generating processing at a predetermined time on a regular basis, for example, at a frequency of one to several times per one day, and more preferably, at a frequency of once every five minutes. The screen data generating processing is processing of generating screen data for displaying a management screen WD including the printer information pertaining to printers of management targets, in the present example, the printers 100A to 100D. FIG. 5 is a flowchart of screen data generating processing.

In S110, the management apparatus 300 collects the printer information from each of the plurality of printers 100A to 100D of management targets. For collection of the printer information, the SNMP is used, in the present example. Specifically, the management apparatus 300 transmits an SNMP request, which requests items to be collected of the printer information, to each of the printers 100A to 100D. The management apparatus 300 receives the printer information from each of the printers 100A to 100D, as a response to the SNMP request. The management apparatus 300 records the collected printer information in the management database PD. The printer information of each printer collected includes the supply method of the ink Ik, the total number of printable sheets TN, the number of tank-printable sheets SN, and the number of remaining printable sheets RN described above.

In S115, the management apparatus 300 selects one notice printer from the printers 100A to 100D of the plurality of management targets.

In S125, the management apparatus 300 determines whether the supply method of the ink Ik of the notice printer is the two-chamber supply method, based on the information indicative of the supply method of the ink Ik acquired as the printer information. For example, in a case where the notice printer is the printer 100A; 100B, it is determined that the supply method is the two-chamber supply method. In a case where the notice printer is the printer 100C; 100D, it is determined that the supply method is not the two-chamber supply method.

When the supply method of the ink Ik is the two-chamber supply method (S125: YES), the management apparatus 300 determines for the notice printer whether the number of remaining printable sheets RN is equal to or smaller than the number of tank-printable sheets SN, in S130. In other words, when the number of remaining printable sheets RN is equal to or smaller than the number of tank-printable sheets SN, it means that the storage state of the ink Ik of the notice printer of the two-chamber supply method is the second storage state S2. When the number of remaining printable sheets RN is larger than the number of tank-printable sheets SN, it means that the storage state of the ink Ik of the notice printer is the first storage state S1.

When the number of remaining printable sheets RN is equal to or smaller than the number of tank-printable sheets SN (S130: YES), since the storage state of the ink Ik is the second storage state S2, the ink Ik does not remain in the ink cartridge 200A. Therefore, in this case, the management apparatus 300 determines the cartridge remaining percentage CR as 0%, in S135 (refer to the equation (1)). Then, in S140, the management apparatus 300 calculates the intermediate tank remaining percentage SR (refer to the equation (2)).

When the number of remaining printable sheets RN is larger than the number of tank-printable sheets SN (S130: NO), since the storage state of the ink Ik is the first storage state S1, the ink Ik remains in the ink cartridge 200A. Therefore, in this case, the management apparatus 300 calculates the cartridge remaining percentage CR, in S150 (refer to the equation (1)). Then, in S155, the management apparatus 300 determines the intermediate tank remaining percentage SR as 100% (refer to the equation (2)).

When the supply method of the ink Ik is not the two-chamber supply method (S125: NO), i.e., when the supply method of the ink Ik is the one-chamber supply method, the management apparatus 300 calculates the cartridge remaining percentage CR, in S160 (refer to the equation (3)). Since the printer 100C of one-chamber supply method does not have an intermediate tank, there is no concept of the intermediate tank remaining rate SR for the printer 100C of one-chamber supply method. For this reason, in the case of the one-chamber supply method, the intermediate tank remaining rate SR is not calculated.

Figure 6A:
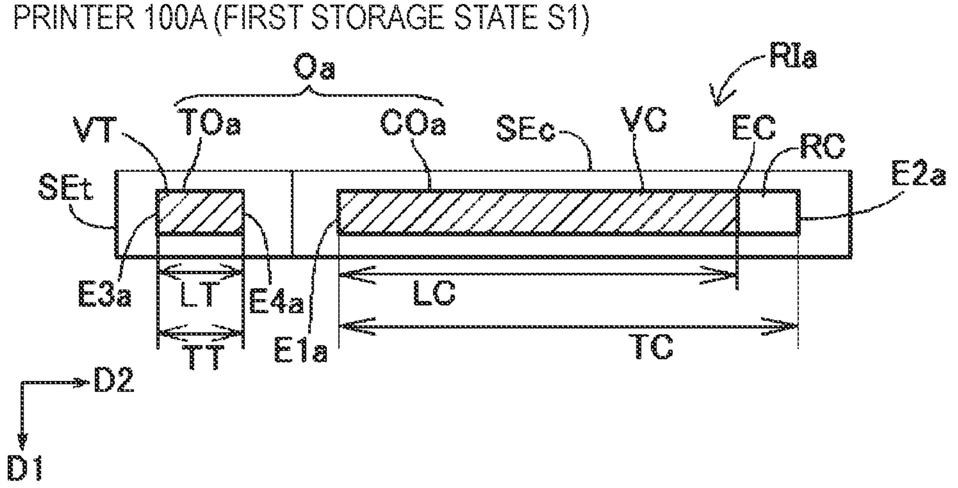
FIGS. 6A to 6C show an example of a display image.
Figure 6B:
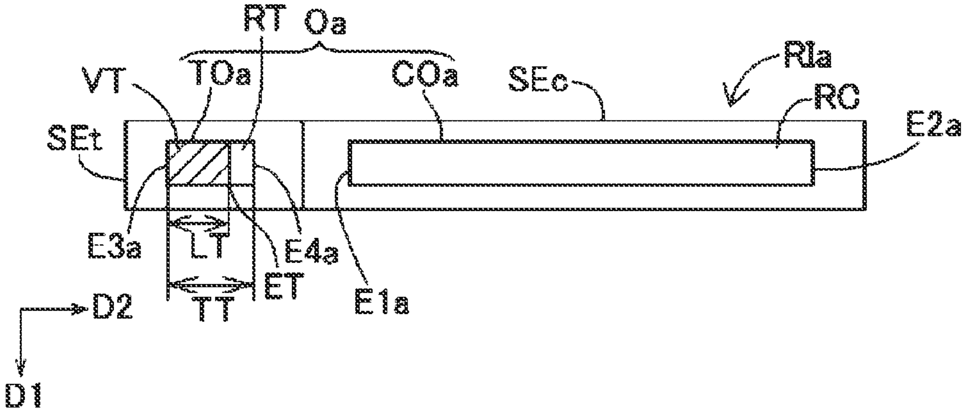

In S165, the management apparatus 300 generates display image data indicating a display image RI. The display image RI is an image for displaying a remaining percentage (the cartridge remaining percentage CR and the intermediate tank remaining percentage SR) of the ink Ik determined using the number of remaining printable sheets RN and the like. An example of a display image RIa indicated by display image data that is generated when the notice printer is the printer 100A of the two-chamber supply method is shown in FIGS. 6A and 6B. FIG. 6A shows the display image Ria when the storage state of the ink Ik in the printer 100A is the first storage state S1.

As shown in FIG. 6A, the display image Ria for the two-chamber supply method includes an object Oa. In FIGS. 6A to 6C and FIGS. 7, 8, 10A, 10B, 11A and 11B, which will be described later, the lateral direction when reference signs in each figure are viewed to be correctly identified is called a second direction D2, and the vertical direction perpendicular to the lateral direction is called a first direction D1. The object Oa includes two sub-objects, i.e., a cartridge object COa and a tank object TOa. The cartridge object COa and the tank object TOa are all band-shaped objects extending linearly in the second direction D2.

The display image RIa includes a tank display field SEt and a cartridge display field SEc. The tank display field SEt and the cartridge display field SEc are aligned in the second direction D2. In the display image Ria corresponding to the printer of the two-chamber supply method, the tank object TOa is displayed in the tank display field SEt, and the cartridge object COa is displayed in the cartridge display field SEc.

The cartridge object COa is an object for displaying the cartridge remaining percentage CR. A position of the cartridge object COa in a length direction (the second direction D2 in FIG. 6A) corresponds to a value that can be taken by the cartridge remaining percentage CR (a value between 0 and 100%). For example, a left end Ela of the cartridge object COa corresponds to a minimum value (0%) that can be taken by the cartridge remaining percentage CR. A right end E2*a* of the cartridge object COa corresponds to a maximum value (100%) that can be taken by the cartridge remaining percentage CR.

Here, it can be said that since the cartridge remaining percentage CR corresponds to the remaining amount of the ink Ik that can be taken in the first storage state S1, the position of the cartridge object COa in the length direction corresponds to the remaining amount of the ink Ik that can be taken in the first storage state S1. For example, the left end Ela of the cartridge object COa corresponds to the minimum value of the remaining amount of the ink Ik that can be taken in the first storage state S1, and the right end E2*a* of the cartridge object COa corresponds to the maximum value of the remaining amount of the ink Ik that can be taken in the first storage state S1. As the position of the band-shaped cartridge object COa in the length direction moves from the right end toward the left end, the corresponding remaining amount of the ink Ik becomes smaller. Therefore, in the band-shaped cartridge object COa, a first position in the length direction (for example, a position of the right end) corresponds to a first remaining amount of the ink Ik (for example, the maximum value in the first storage state S1), and a second position (for example, a position of the left end) located closer to the left end than the first position corresponds to a second remaining amount (for example, the minimum value in the first storage state S1) smaller than the first remaining amount of the ink Ik. As a result, by using the band-shaped cartridge object COa, it is possible to implement the display image Ria whereby the remaining percentage of the ink Ik in the first storage state S1 of the printer 100A can be easily perceived.

The tank object TOa is an object for displaying the intermediate tank remaining percentage SR. A position of the tank object TOa in a length direction (the second direction D2 in FIG. 6A) corresponds to a value that can be taken by the intermediate tank remaining percentage SR (a value between 0 and 100%). For example, a left end E3*a* of the tank object TOa corresponds to a minimum value (0%) that can be taken by the intermediate tank remaining percentage SR. A right end E4*a* of the tank object TOa corresponds to a maximum value (100%) that can be taken by the intermediate tank remaining percentage SR.

Here, it can be said that since the intermediate tank remaining percentage SR corresponds to the remaining amount of the ink Ik that can be taken in the second storage state S2, the position of the tank object TOa in the length direction corresponds to the remaining amount of the ink Ik that can be taken in the second storage state S2. For example, the left end E3*a* of the tank object TOa corresponds to the minimum value of the remaining amount of the ink Ik that can be taken in the second storage state S2, and the right end E4*a* of the tank object TOa corresponds to the maximum value of the remaining amount of the ink Ik that can be taken in the second storage state S2. Similar to the cartridge object COa, as the position of the band-shaped tank object TOa in the length direction moves from the right end toward the left end, the corresponding remaining amount of the ink Ik becomes smaller.

A ratio of an overall length (TT+TC) of the object OA in the length direction and a length (TT) of the tank object TOa in the length direction is the same as a ratio of the total number of printable sheets TN and the number of tank-printable sheets SN.

The cartridge object CO has a fixed size, irrespective of the cartridge remaining percentage CR. In FIG. 6A showing the remaining percentage of the ink Ik corresponding to the first storage state S1, a hatched area of the cartridge object COa is a variable area VC whose size (specifically, a length in the length direction) varies according to the cartridge remaining percentage CR, and is a part indicative of the remaining percentage of the ink Ik. An unhatched area of the cartridge object COa is a remaining area RC of the cartridge object COa, which is a rest area except the variable area VC. In other words, when indicating the cartridge remaining percentage CR greater than 0%, i.e., the remaining percentage of the ink Ik corresponding to the first storage state S1, the cartridge object COa is displayed divided into the variable region VC and the remaining region RC. For this reason, as shown in FIG. 6A, in the first storage state S1, a boundary EC between the variable region VC and the remaining area RC is located in the cartridge object COa. A ratio of a part, which is occupied by the variable region VC, of the cartridge object COa, i.e., a ratio of a length LC in the length direction of the part occupied by the variable area VC to a length TC in the length direction of the cartridge object COa is the same as the cartridge remaining percentage CR (CR=LC/TC).

The tank object TO has a fixed size, irrespective of the intermediate tank remaining percentage SR. In FIG. 6B showing the remaining amount of the ink Ik corresponding to the second storage state S2, a hatched area of the tank object TOa is a variable area VT whose size (specifically, a length in the length direction) varies according to the intermediate tank remaining percentage SR, and is a part indicative of the remaining percentage of the ink Ik. An unhatched area of the tank object TOa is a remaining area RT of the tank object TOa, which is a rest area except the variable area VT. In other words, when indicating the intermediate tank remaining percentage SR smaller than 100%, i.e., the remaining percentage of the ink Ik corresponding to the second storage state S2, the tank object TOa is displayed divided into the variable region VT and the remaining region RT. For this reason, as shown in FIG. 6B, in the second storage state S2, a boundary ET between the variable region VT and the remaining area RT is located in the tank object TOa. A ratio of a part, which is occupied by the variable region VT, of the tank object TOa, i.e., a length LT in the length direction of the part occupied by the variable area VT to a length TT in the length direction of the tank object TOa is the same as the intermediate tank remaining percentage SR (SR=LT/TT).

Note that, in the first storage state S1, the intermediate tank remaining percentage SR is 100%. Therefore, in FIG. 6A, the entire tank object TOa is the variable region VT. In the second storage state S2, the cartridge remaining percentage CR is 0%. Therefore, in FIG. 6B, the entire cartridge object COa is the remaining region RC. In addition, a sum (LT+LC) of the lengths of the variable areas VT and VC to a sum (TT+TC) of the lengths in the length direction of the tank object TOa and the cartridge object COa is the same as a remaining percentage of the overall ink Ik. That is, a remaining percentage of the overall ink Ik is (LT+LC)/(TT+TC).

As can be seen from the above descriptions, the object Oa indicates an index value (for example, the percentage remaining of the ink Ik) pertaining to the remaining amount of the ink Ik that is supplied to the printer 100A. A left end of the object Oa (the left end E3*a* of the tank object TO) corresponds to a minimum value of the index value, and a right end of the object Oa (the right end E2*a* of the cartridge object COa) corresponds to a maximum value of the index value.

Note that, a timing of ordering a cartridge to be used next time (also called a cartridge for replacement) of the ink cartridge currently mounted is called an ordering timing. As for the printer 100A of the two-chamber supply method, a default ordering timing of a cartridge for replacement is when transition from the first storage state S1 to the second storage state S2 is made, i.e., when the remaining amount of the ink Ik in the ink cartridge 200A becomes zero. For this reason, in the display image RIa corresponding to the printer 100A of the two-chamber supply method, the ordering timing is when the variable area VT has disappeared in the cartridge object COa in the cartridge display field SEc and the entire cartridge object becomes the remaining area RC.

Figure 6C:
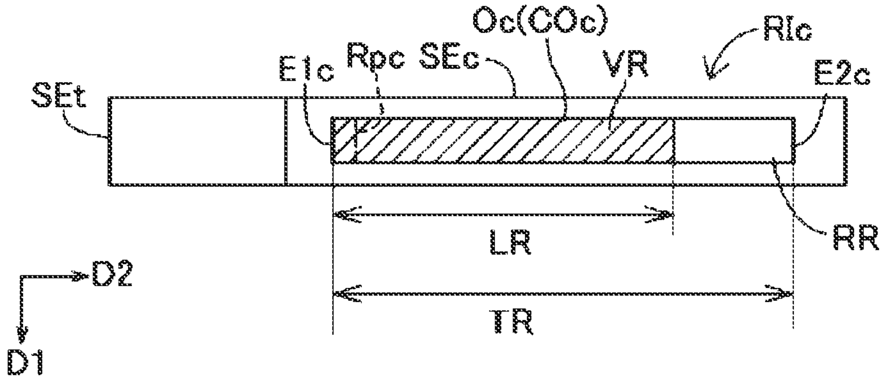

An example of a display image RIc indicated by display image data that is generated when the notice printer is the printer 100C of one-chamber supply method is shown in FIG. 6C. The display image RIc includes an object Oc. Since the printer 100C of one-chamber supply method does not have an intermediate tank, the object Oc is only a cartridge object COc, and does not include a tank object. For this reason, the remaining percentage of the overall ink Ik is the cartridge remaining percentage CR.

The display image RIc includes a tank display field SEt and a cartridge display field SEc, which are aligned in the second direction D2, similar to the above-described display image Ria. In the display image RIc corresponding to the printer of one-chamber supply method, the tank display field SEt is blank, and the object Oc (cartridge object COc) is displayed in the cartridge display field SEc.

The object Oc has a fixed size, irrespective of the cartridge remaining percentage CR. In FIG. 6C, a hatched area of the object Oc is a variable area VR whose size (specifically, a length in the length direction) varies according to the cartridge remaining percentage CR, and is a part indicative of the remaining percentage of the ink Ik. An unhatched area of the object Oc is a remaining area RR of the object Oc, which is a rest area except the variable area VR. In other words, when indicating the cartridge remaining percentage CR greater than 0%, the object Oc is displayed divided into the variable region VR and the remaining region RR. A ratio of a part, which is occupied by the variable region VR, of the object Oc, i.e., a length LR in the length direction of the part occupied by the variable area VR to a length TR in the length direction of the object Oc is the same as the cartridge remaining percentage CR (CR=TR/LR).

As can be seen from the above descriptions, the object Oc indicates an index value (for example, the percentage remaining of the ink Ik) pertaining to the remaining amount of the ink Ik that is supplied to the printer 100C. A left end E1*c* of the object Oc corresponds to a minimum value of the index value, and a right end E2*c* of the object Oc corresponds to a maximum value of the index value.

Here, for the printer 100C of one-chamber supply method, the ordering timing of the cartridge for replacement is when the remaining amount of the ink Ik in the ink cartridge 200C becomes a reference amount. A default reference amount is determined, for example, taking into account an amount of printing performed after the cartridge for replacement is ordered until the cartridge for replacement is delivered to the user. For example, the default reference amount is set to an amount of the ink Ik necessary for a predetermined number of sheets (in the present example, 100 sheets) of printing. In the object Oc of FIG. 6C, an ordering handling position Rpc corresponding to the default ordering timing is shown with a dashed line, The ordering handling position Rpc is a position in the length direction on the object Oc corresponding to an index value (for example, a specific remaining percentage of the ink Ik) corresponding to the ordering timing.

Note that, although detailed descriptions are omitted, a display image Rib indicated by display image data that is generated when the notice printer is the printer 100B includes an object Ob consisting of a tank object and a cartridge object, similar to the display image RIa of FIGS. 6A and 6B. A display image RId indicated by display image data that is generated when the notice printer is the printer 100D includes an object Od only consisting of a cartridge object, similar to the display image RIc of FIG. 6C.

In S570 of FIG. 5, the management apparatus 300 determines whether all the printers of management targets have been treated as the notice printer. When there is a printer that has not been treated (S170: NO), the management apparatus 300 returns to S115, and selects the printer that has not been treated, as the notice printer. When all the printers have been treated (S170: YES), the management apparatus 300 proceeds to S175.

Figure 7:
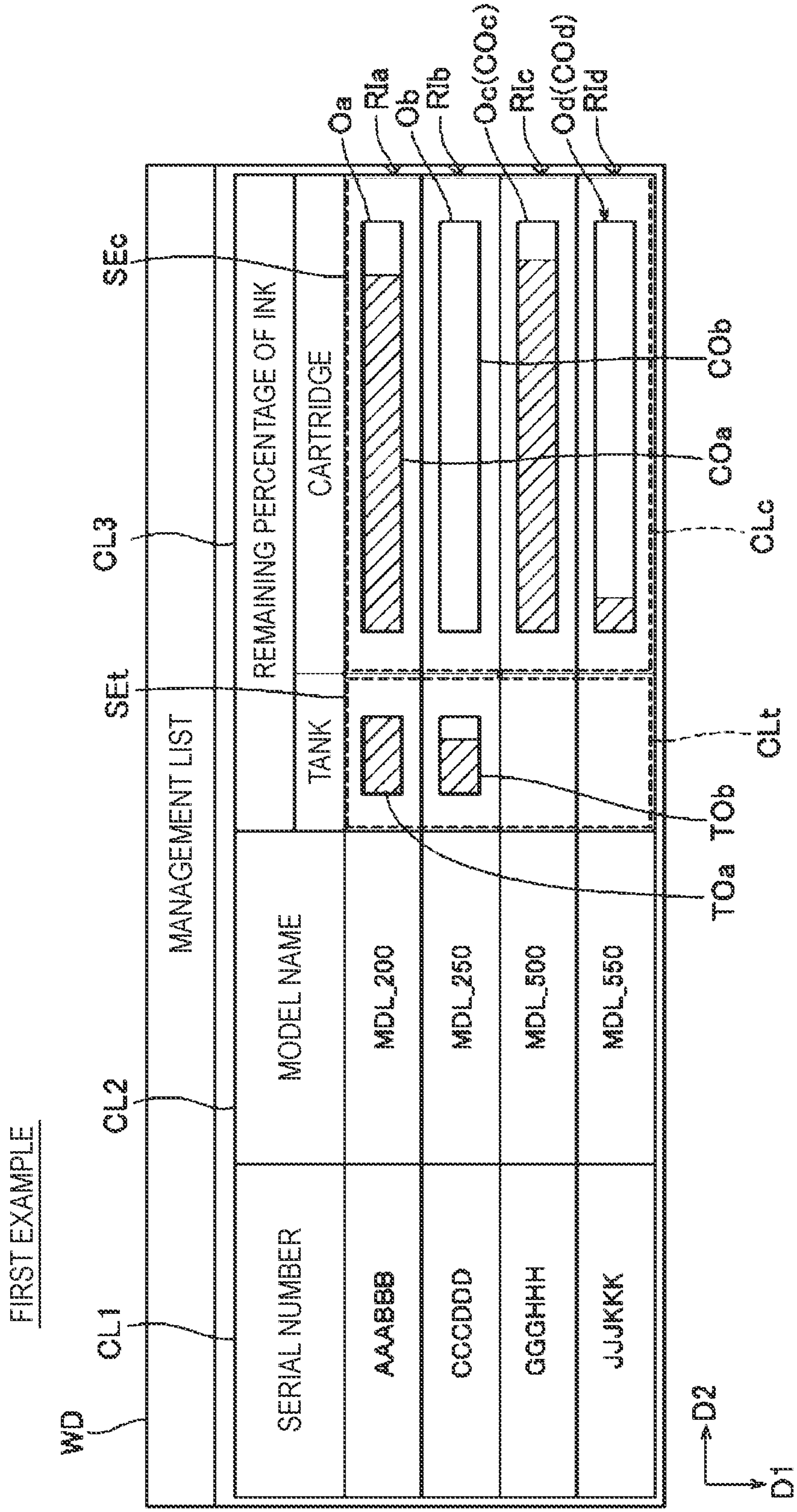
FIG. 7 shows an example of a management screen WD.

In S175, the management apparatus 300 generates display screen data indicating a management screen WD with using the display image data generated for each of the printers 100A to 100D to. FIG. 7 shows an example of a management screen WD. The management screen WD is a list of the printer information of the printers 100A to 100D of management targets. The management screen WD includes a plurality of display areas configured to display a plurality of items of the printer information. FIG. 7 shows three display areas CL1 to CL3 of the display areas. For example, the display area CL1 displays the serial numbers of the printers 100A to 100D of management targets, and the display area CL2 displays the model names of the printers 100A to 100D of management targets. The display area CL3 displays the above-described display images RIa to RID as the information indicative of the remaining percentages of the ink Ik of the printers 100A to 100D of management targets.

As shown in FIG. 7, the display area CL3 includes a tank display area CLt and a cartridge display area CLc. The tank display area CLt consists of the respective tank display fields SEt of the display images RIa to RId. The tank display fields SEt are aligned along the first direction D1 to form a column. The cartridge display area CLc consists of the respective cartridge display fields SEc of the display images RIa to RId. The cartridge display fields SEt are aligned in the first direction D1 to form a column. The tank display area CLt and the cartridge display area CLc are two columns of display areas whose positions in the second direction D2 are different from each other.

In the example shown in FIG. 7, in the display images RIa and RIb corresponding to the printers 100A and 100B of the two-chamber supply method, the display image RIa indicates the remaining percentage of the ink Ik corresponding to the first storage state S1, and the display image RIb indicates the remaining percentage of the ink Ik corresponding to the second storage state S2. In addition, the display image RIc of the display images RIc and RId corresponding to the printers 100C and 100D of one-chamber supply method indicates a relatively large remaining percentage of the ink Ik, and the display image Rid indicates a relatively small remaining percentage of the ink Ik.

When the screen data is generated in S175, the screen data generating processing is ended.

The management apparatus 300 displays the management screen WD on the display unit 340, based on a predetermined trigger with using the screen data generated by the screen data generating processing. For example, the management apparatus 300 displays the management screen WD at the time of activation of the computer program PG2. In addition, when the management apparatus 300 receives a display request from the user via the operation unit 350, the management apparatus 300 displays the management screen WD on the display unit 340. The user of the management apparatus 300 is, for example, an administrator of the system 1000. The administrator of the system 1000 may be the user of the printers 100A to 100D, or may be a person different from the user of printers 100A to 100D, for example, a seller of the printers 100A to 100D.

A-2-2. Management Screen Display Processing

Figure 9:
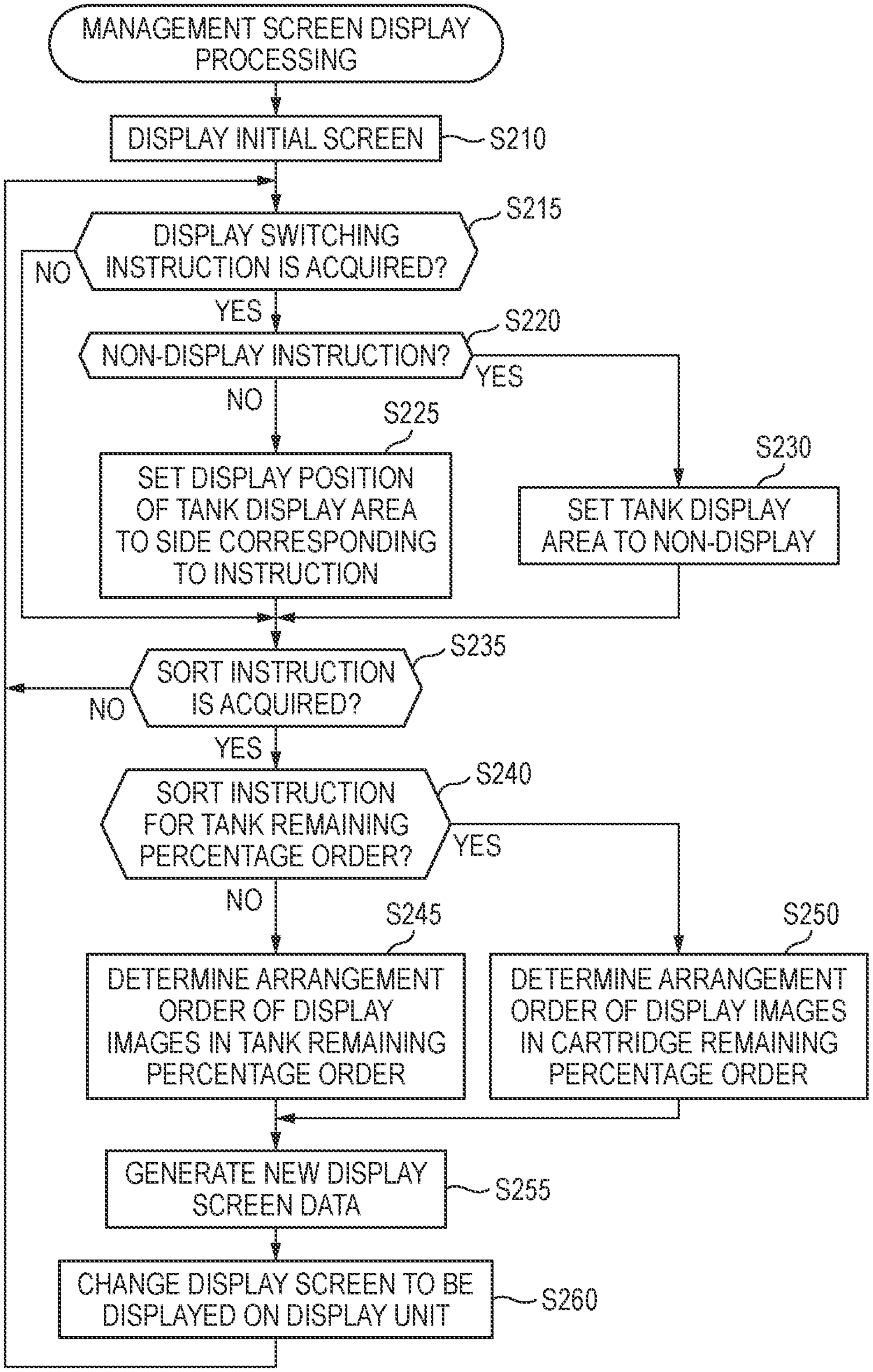
FIG. 9 is a flowchart of management screen display processing.

Management screen display processing, which includes processing of changing the display area CL3 of the management screen WD in response to a user's instruction, is described. FIG. 9 is a flowchart of management screen display processing. FIGS. 10 and 11 show an example of the changed display area CL3. For example, when the management apparatus 300 acquires a display request from the user via the operation unit 350, the management apparatus 300 starts management screen display processing.

In S210, the management apparatus 300 displays an initial screen of the management screen WD on the display unit 340 with using the generated display screen data. The display screen data is generated by the management apparatus 300 periodically executing screen data generating processing (FIG. 5) similar to the first example. The initial screen of the management screen WD of the second example is the management screen WD shown in FIG. 7.

In S215, the management apparatus 300 determines whether a display switching instruction has been acquired. As shown in FIGS. 10 and 11, in the present example, the user can input a display switching instruction and a sort instruction by operating a sub-window SW displayed on the display unit 340 with a cursor CS while the management screen WD is displayed. The management apparatus 300 acquires a display switching instruction when the display switching instruction is input by the user.

Figure 10A:
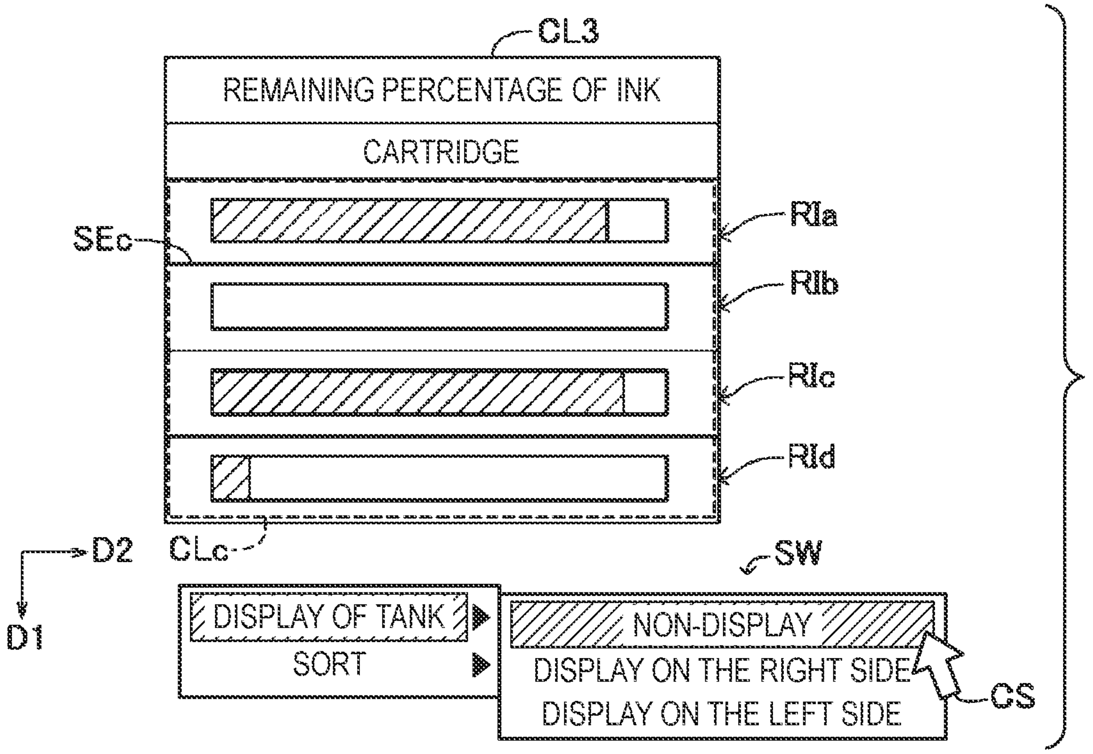
FIGS. 10A and 10B is a first view showing an example of a display area CL3 after change.
Figure 10B:
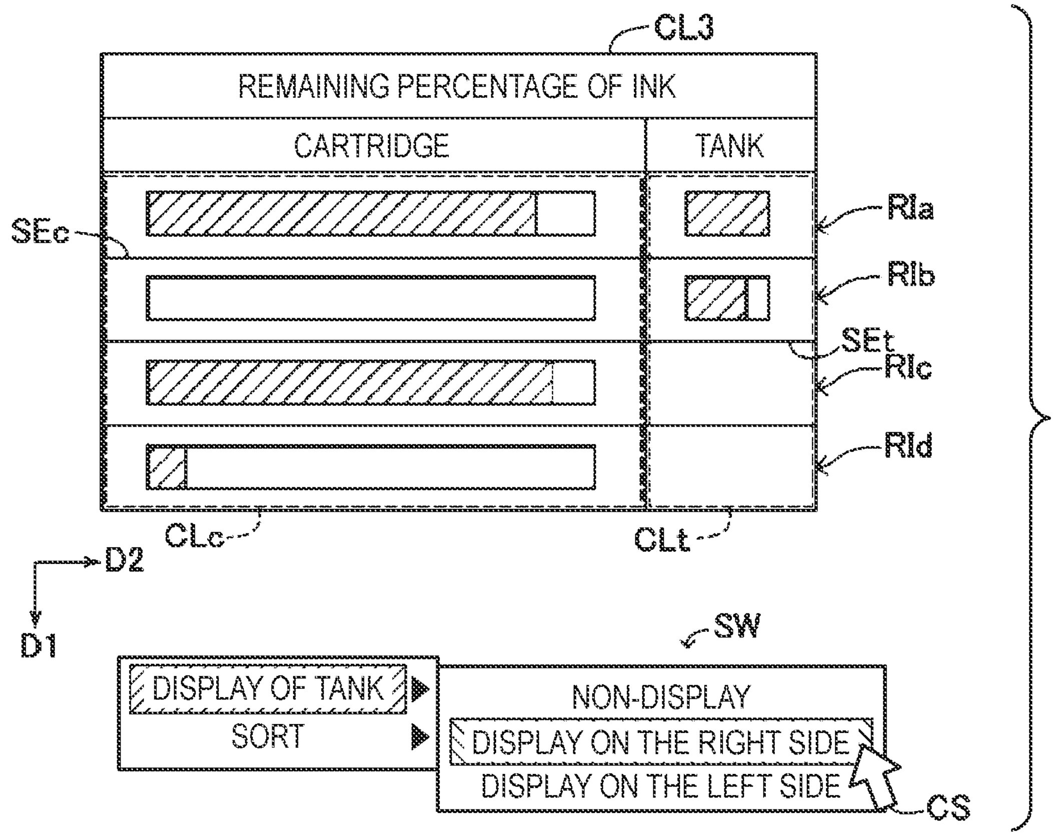

The display switching instruction instructs to switch a display aspect of the tank display area CLt in the display area CL3. In the present example, the display switching instruction is any one of a non-display instruction, an instruction for display on a right side and an instruction for display on a left side (FIG. 10A). When the display switching instruction is acquired (S215: YES), the management apparatus 300 proceeds to S220, and when the display switching instruction is not acquired (S215: NO), the management apparatus 300 proceeds to S235.

In S220, the management apparatus 300 determines whether the acquired display switching instruction is a non-display instruction. When the acquired display switching instruction is a non-display instruction (S220: YES), the management apparatus 300 sets the tank display area CLt in the display area CL3 to a non-display, in S230. FIG. 10A shows the display area CL3 in a case where the tank display area CLt is set to a non-display. The display area CL3 in FIG. 10A includes the cartridge display area CLc, and does not include the tank display area CLt.

When the acquired display switching instruction is not a non-display instruction (S220: NO), in other words, when the acquired display switching instruction is any one of an instruction for display on a right side and an instruction for display on a left side, the management apparatus 300 proceeds to S225. In S225, the management apparatus 300 sets a display position of the tank display area CLt to a side, which corresponds to the instruction, of the right side and the left side of the display area CL3. In the display area CL3 in FIG. 10B, the tank display area CLt is displayed in a display position on the right side with respect to the cartridge display area CLc. An example where the tank display area CLt is displayed in a display position on the left side with respect to the cartridge display area CLc is shown in FIG. 7.

Figure 11A:
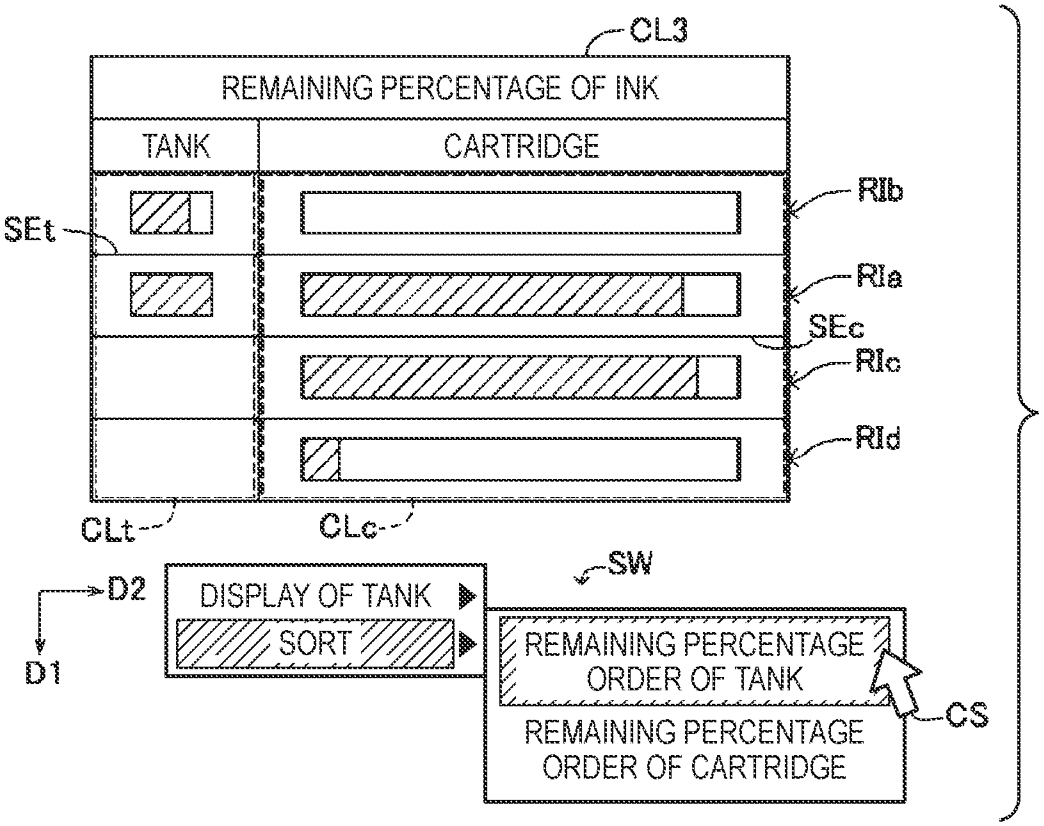
FIGS. 11A and 11B is a second view showing an example of the display area CL3 after change.

In S240, the management apparatus 300 determines whether a sort instruction has been acquired. When a sort instruction is input via the sub-window SW by the user, the management apparatus 300 acquires the sort instruction. The sort instruction instructs to change an arrangement order of the plurality of display images RIa to RId in the display area CL3. In the present example, the sort instruction is any one of a sort instruction for tank remaining percentage order and a sort instruction for cartridge remaining percentage order (FIG. 11A). The sort instruction for tank remaining percentage order is an instruction to change an arrangement order of the plurality of display images RIa to RId in order of the remaining percentages of the ink Ik in the intermediate tanks (for example, 175A in FIGS. 2A and 2B). The sort instruction for cartridge remaining percentage order is an instruction to change the arrangement order in order of the remaining percentages of the ink Ik in the ink cartridges 200A to 200D.

When the sort instruction is acquired (S235: YES), the management apparatus 300 proceeds to S240, and when the sort instruction is not acquired (S235: NO), the management apparatus 300 returns to S215.

In S240, the management apparatus 300 determines whether the acquired sort instruction is a sort instruction for tank remaining percentage order. When the acquired sort instruction is a sort instruction for tank remaining percentage order (S240: YES), the management apparatus 300 determines an arrangement order of the display images RIa to RId in the display area CL3, in ascending order of the remaining percentages of the ink Ik remaining in the intermediate tanks indicated by the display images, i.e., in ascending order of the intermediate tank remaining percentages SR, in S245. Note that, in the present example, the display images RIc and RId corresponding to printers of one-chamber supply method without an intermediate tank are determined in arrangement order after the display images Ria and RIb corresponding to printers of the two-chamber supply method. In a modified example, the display images RIc and Rid may also be determined in arrangement order before the display images RIa and Rib. FIG. 11A shows the display area CL3 after alignment in tank remaining percentage order. In the example of FIG. 11A, the display images Ria and RIb are aligned from the upper side toward the lower side in ascending order of the remaining percentages of the ink Ik remaining in the intermediate tanks. The display images RIc and Rid corresponding to printers of one-chamber supply method are aligned below the display images RIa and Rib corresponding to printers of the two-chamber supply method.

Figure 11B:
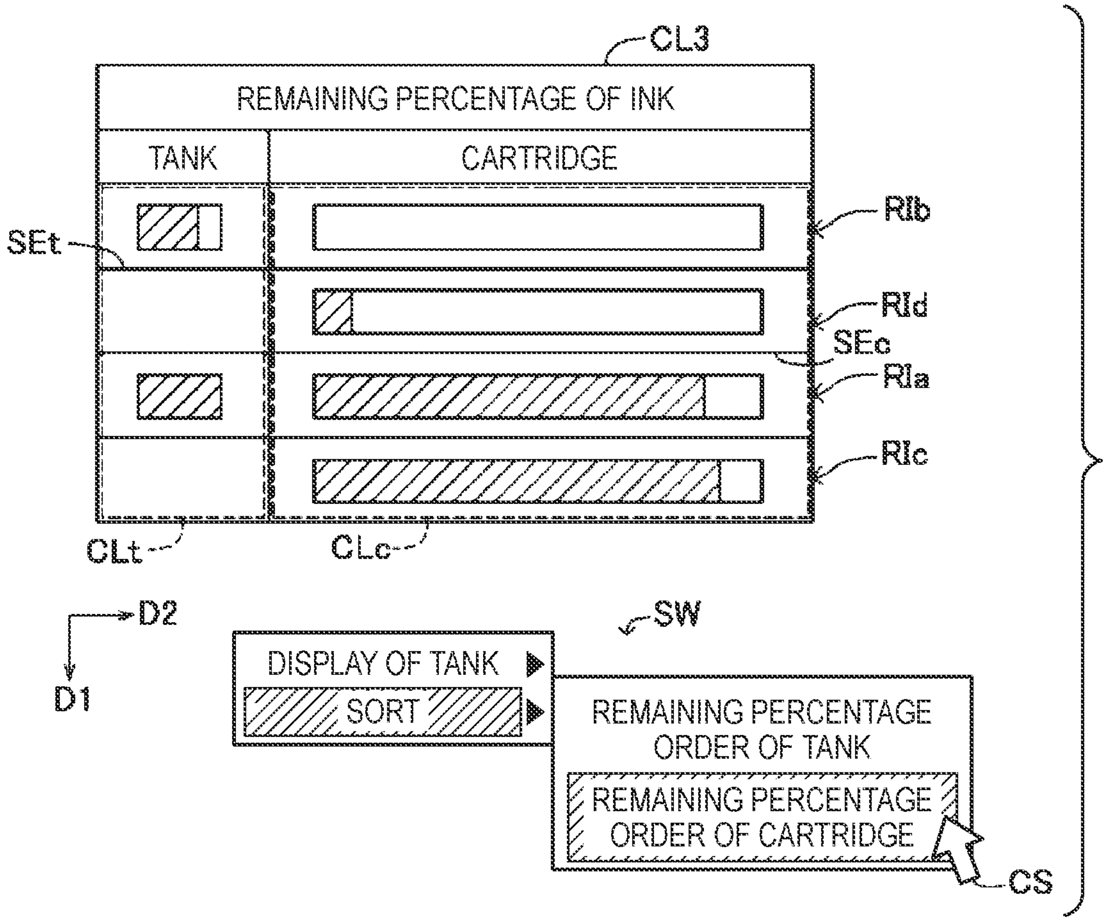

When the acquired sort instruction is not a sort instruction for tank remaining percentage order (S240: NO), in other words, when the acquired sort instruction is a sort instruction for cartridge remaining percentage order, the management apparatus 300 determines an arrangement order of the display images Ria to RId in the display area CL3, in ascending order of the remaining percentages of the ink Ik remaining in the ink cartridges indicated by the display images, i.e., in ascending order of the cartridge remaining percentages CR, in S250. FIG. 1B shows the display area CL3 after alignment in cartridge remaining percentage order. In the example of FIG. 11B, the display images Ria to Rid are aligned from the upper side toward the lower side in ascending order of the remaining percentages of the ink Ik remaining in the ink cartridges.

In S255, the management apparatus 300 generates new display screen data. The management screen WD indicated by the new display screen data is a screen in which the tank display area CLt is displayed in the display aspect set in S225 and S230 or a screen in which the display images RIa to RId are aligned in arrangement order determined in S245 and S250. For example, the management screen WD indicated by the new display screen data includes the display area CL2 shown in FIGS. 10 and 11.

In S260, the management apparatus 300 changes the management screen WD displayed on the display unit 340 with using the new display screen data. After S260, the management apparatus 300 returns to S215.

According to the present example described above, the management apparatus 300 acquires the number of remaining printable sheets RN, which is the information pertaining to the remaining amount of the ink Ik, from the printers 100A to 100D (S110 in FIG. 5). The management apparatus 300 generates the display screen data indicating the management screen WD, which includes the display image Ria for displaying the index value (for example, the remaining percentage of the ink Ik) determined using the number of remaining printable sheets RN of the printer 100A and the display image RIc for displaying the index value determined using the number of remaining printable sheets RN of the printer 100C (S115 to S175 in FIG. 5). Then, the management apparatus 300 displays the management screen WD on the display unit 340 with using the display screen data. The display image RIa includes the cartridge object COa indicative of the remaining percentage of the ink Ik corresponding to the first storage state S1 and the tank object TOa indicative of the remaining percentage of the ink Ik corresponding to the second storage state S2 (FIGS. 6A and 6B). The display image RIc includes the object Oc (cartridge object COc) indicative of the remaining percentage of the ink Ik corresponding to a remaining state of the ink Ik in the printer 100C (FIG. 6C). The cartridge object COa of the display image RIa is displayed in the cartridge display field SEc, which corresponds to the printer 100A, in the cartridge display area CLc. The tank object COa of the display image RIa is displayed in the tank display field SEt, which corresponds to the printer 100A, in the tank display area CLt. The cartridge object COc of the display image RIc is displayed in the cartridge display field SEc, which corresponds to the printer 100C, in the cartridge display area CLc. By the area in which the object is displayed, it is possible to easily perceive whether the object indicates the remaining percentage of the ink Ik corresponding to the remaining state of the ink Ik in the ink cartridge or the remaining percentage of the ink Ik corresponding to the second storage state S2 of the second-chamber supply method. Therefore, it is possible to improve convenience for a user of the management screen WD configured to display the index values pertaining to the remaining amounts of the ink Ik for the plurality of printers.

Figure 8:
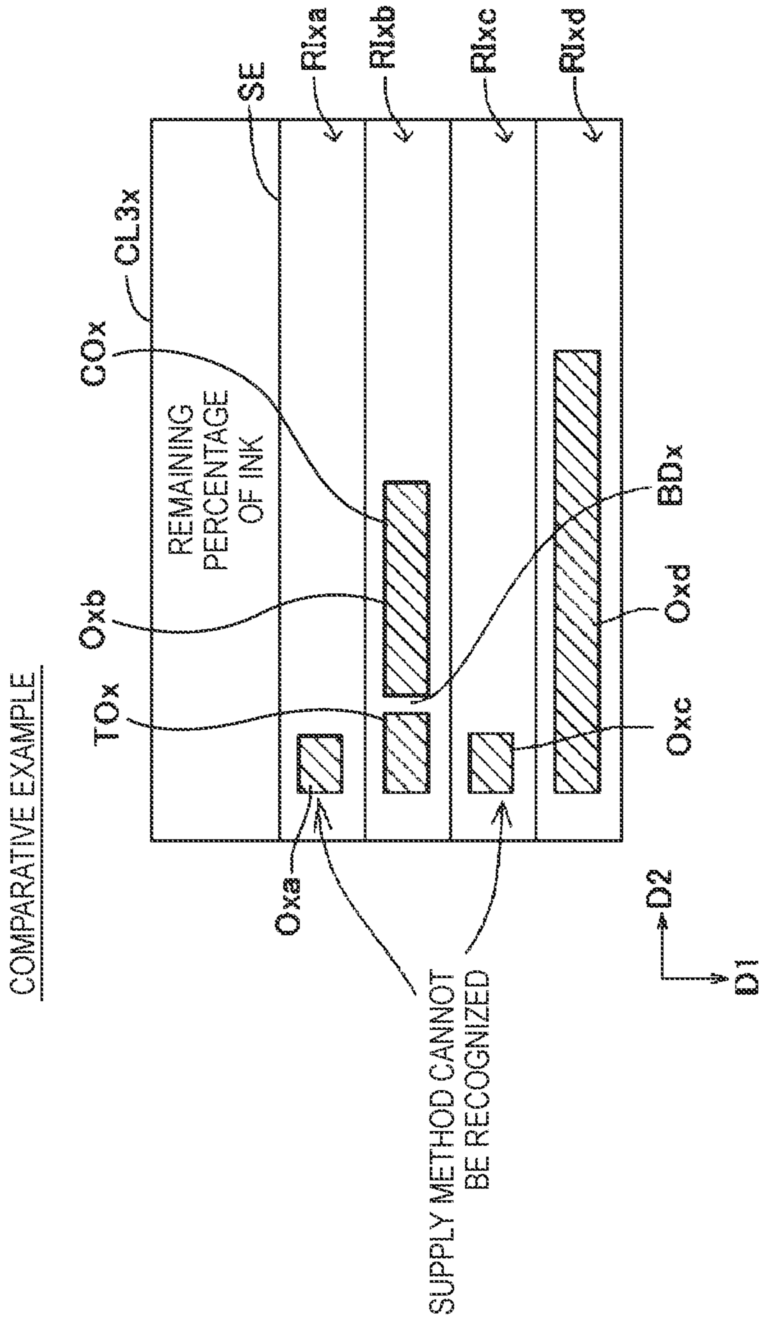
FIG. 8 shows an example of a display area CL3*x* of a management screen of a comparative example.

FIG. 8 shows an example of a display area CL3$x$ of a management screen of Comparative Example. The display area CL3$x$ includes display images RIxa to RIxd corresponding to the printers 100A to 100D. In Comparative Example, objects Oxa to Oxd of the display images RIxa to RIxd are not divided into a variable area and a remaining area, unlike the first example. In Comparative Example, the objects Oxa to Oxd are configured so that an overall length of the object varies according to the remaining percentage of the ink Ik. In other words, each object of Comparative Example consists of only the variable area of the first example. In Comparative Example, the objects Oxa to Oxd are each displayed in one area of a plurality of object display fields SE aligned in one column, irrespective of whether the object is the tank object TOx or the cartridge object COx.

In the example shown in FIG. 8, similar to the example of FIG. 7, the display image RIxa indicates the remaining percentage of the ink Ik corresponding to the second storage state S2, and the display image RIxb indicates the remaining percentage of the ink Ik corresponding to the first storage state S1. In addition, the display image RIxc indicates the relatively small remaining percentage of the ink Ik, and the display image RIxd indicates the relatively large remaining percentage of the ink Ik.

When indicating the remaining percentage of the ink Ik corresponding to the first storage state S1, the object of Comparative Example corresponding to the printer of the two-chamber supply method includes an image indicating a boundary portion BDx because the object is divided into a tank object TOx and a cartridge object COx, as shown in an object Oxb in FIG. 8. However, when indicating the remaining percentage of the ink Ik corresponding to the second storage state S2, since the cartridge object is not displayed and only the tank object is displayed, an image indicating a boundary portion is not present, as shown in an object Oxa in FIG. 8. Therefore, as shown in FIG. 8, the object Oxa corresponding to the printer 100A of the two-chamber supply method is the same as the object Oxc corresponding to the printer 100C of one-chamber supply method. As a result, in Comparative Example, the user who sees the objects Oxa and Oxc cannot know whether the objects Oxa and Oxc indicate the remaining percentage of the ink Ik remaining in the ink cartridge of the printer of one-chamber supply method or the remaining percentage of the ink Ik (the remaining percentage of the ink Ik remaining in the intermediate tank 175A) corresponding to the second storage state S2 of the printer of the two-chamber supply method. In contrast, in the example of FIG. 7 of the first example, the tank objects TOa and TOb corresponding to the printers 100A and 100B of the two-chamber supply method are displayed in the tank display area CLt, and the cartridge objects COa to COd are displayed in the cartridge display area CLc. This allows the user who sees the object Oa to easily recognize that the object Oa indicates the remaining percentage of the ink Ik corresponding to the second storage state S2 of the printer of the two-chamber supply method. In addition, the user who sees the object Oc can easily recognize that the object Oc indicates the remaining percentage of the ink Ik remaining in the ink cartridge of the printer of one-chamber supply method.

Further, according to the above-described example, the tank display fields SEt, which correspond to the printers 100C and 100D of one-chamber supply method, in the tank display area CLt are blank (FIG. 7). As a result, the user can easily recognize whether the corresponding printer is a printer of a two-chamber supply method or a printer of one-chamber supply method, depending on whether the tank object is displayed in the tank display area CLt or the tank display area is blank.

The printer 100A of the two-chamber supply method can continue printing even in the second storage state S2 where the ink Ik does not remain in the ink cartridge 200A, as long as the ink Ik remains in the intermediate tank 175A. The printer 100C of one-chamber supply method cannot continue printing in a state where the ink Ik does not remain in the ink cartridge 200C. As a result, the preferred ordering timing of the ink cartridge 200A and the preferred ordering timing of the ink cartridge 200C are different, as described above. For this reason, if the user cannot recognize whether the corresponding printer is a printer of a two-chamber supply method or a printer of one-chamber supply method at the time of seeing the objects Oa to Od, the user may not know whether the ordering timing of a cartridge for replacement has arrived for the corresponding printer. In the present example, such inconvenience can be suppressed.

Further, according to the above-described example, the management apparatus 300 sorts the plurality of display images Ria to RId arranged along the first direction D1 in the displayed management screen WD, based on the intermediate tank remaining percentages SR or the cartridge remaining percentages CR corresponding to the plurality of display images (S235 to S260 in FIG. 9). As a result, it is possible to further improve the convenience for the user of the management screen WD. For example, it is possible to easily extract a printer where the remaining percentage of the ink Ik is small, and therefore, the replacement timing is approaching the ordering timing.

Further, according to the above-described example, the management apparatus 300 sorts the plurality of display images RIa to Rid in order of, for example, prioritizing the two or more display images RIa and Rib corresponding to the two or more printers of the two-chamber supply method over the two or more display images RIc and Rid corresponding to the two or more printers of one-chamber supply method (S235 to S260 in FIG. 9, and FIG. 11A). As a result, since the display images Ria to Rid can be sorted in appropriate order according to the supply method of the ink Ik (i.e., the structure of the ink supply unit), the convenience for the user of the management screen WD can be further improved.

Further, according to the above-described example, the management apparatus 300 switches between display and non-display of the tank display area CLt in the management screen WD, based on the user's instruction (S215 to S230, S255 and S260 in FIG. 9). For example, it may not be necessary to display the tank display area CLt, when it is apparent that a certain amount of the ink Ik remains in the ink cartridge, and the like. In this case, the tank display area CLt is set to the non-display, and therefore, only the remaining percentage of the ink Ik in the ink cartridge can be displayed in an easy-to-see manner, which is convenient.

Further, according to the above-described example, the management apparatus 300 switches the position where the tank display area CLt is arranged between a position (for example, a right side) on the second direction D2-side with respect to the cartridge display area CLc and to a position on an opposite side (left side) to the second direction D2 with respect to the cartridge display area CLc, in the management screen WD (S215, S225, S255 and S260 in FIG. 9). As a result, it is possible to further improve the convenience for the user of the management screen WD. For example, the user can display the tank display area CLt on the easy-to-see side.

Further, according to the above-described example, the first direction D1 in which the display images Ria to RId are aligned is the vertical direction, and the second direction D2 in which the tank display area CLt and the cartridge display area CLc are aligned is the lateral direction. As a result, the display images Ria to RId of the plurality of printers can be displayed in an easy-to-see manner in the management screen WD.

As can be seen from the above descriptions, the ink cartridge 200A is an example of the first cartridge, and the ink cartridge 200C is an example of the second cartridge. The number of remaining printable sheets RN acquired from the printer 100A is an example of the first information, and the number of remaining printable sheets RN acquired from the printer 100C is an example of the second information. The cartridge object COa of the object Oa is an example of the first object, the tank object TOa of the object Oa is an example of the second object, and the object Oc (cartridge object COc) is an example of the third object. The cartridge display area CLc is an example of the first area, and the tank display area CLt is an example of the second area.

B. Second Example

Figure 12:
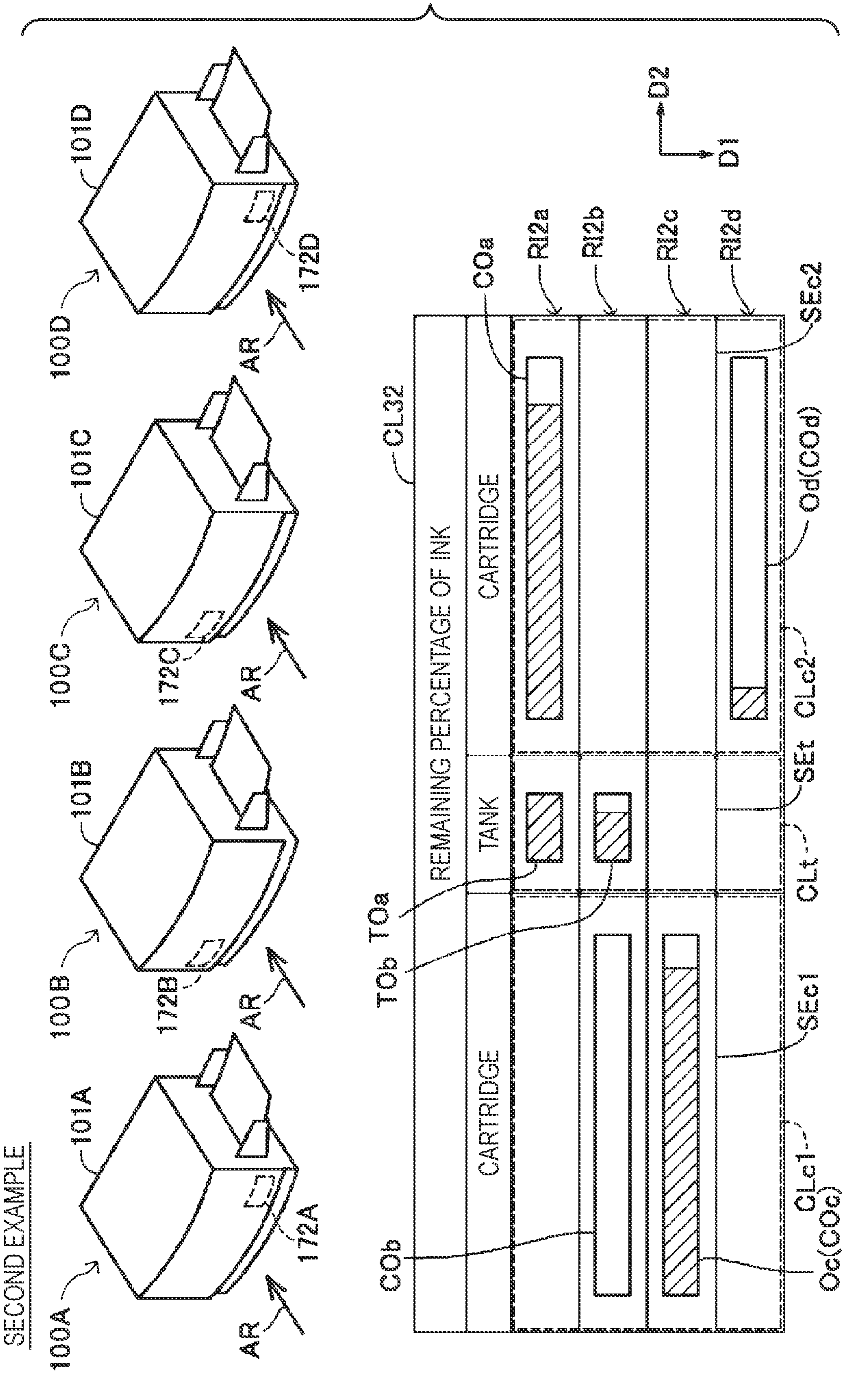
FIG. 12 illustrates another example.

FIG. 12 illustrates a second example. As shown in FIG. 12, the printers 100A to 100D have housings 101A to 101D configured to accommodate the print execution unit 160 and the ink supply units 170A to 170D of FIGS. 1A and 1B, respectively. The printers 100A to 100D are different in terms of models, respectively, and positions of the mounting parts 172A to 172D configured to mount the ink cartridges 200A to 200D may be different. In the present example, when the printers 100A and 100D are seen from the front (as seen in a direction denoted with an arrow AR in FIG. 12), the mounting parts 172A and 172D are arranged in positions on the right side (hereinafter, referred to as the right positions) of centers of the housings 101A and 101D in the lateral direction. When the printers 100B and 100C are seen from the front, the mounting parts 172B and 172C are arranged in positions on the left side (hereinafter, referred to as the left positions) of centers of the housings 101B and 101C in the lateral direction.

In the second example, a display area CL32 of FIG. 12 is displayed, instead of the display area CL3 (FIG. 7) of the management screen WD of the first example. The display area CL32 includes a plurality of display images RI2*a* to RI2*d* corresponding to the printers 100A to 100D.

The display area CL32 includes a tank display area CLt similar to the first example, and two cartridge display areas CLc1 and CLc2. Similar to the cartridge display area CLc1 of the first example, the left cartridge display area CLc1 consists of a plurality of cartridge display fields SEc1 aligned along the first direction D1, and the right cartridge display area CLc2 consists of a plurality of cartridge display fields SEc2 aligned along the first direction D1.

The display images RI2*a* and RI2*b* corresponding to the two-chamber supply method include a tank object TOa; TOb and a cartridge object COa; COb, respectively, similar to the first example. The tank objects TOa and TOb are displayed in the corresponding tank display fields SEt of the tank display area CLt, similar to the first example. The cartridge object COa of the display image RI2*a* corresponding to the printer 100A where the mounting part 172A is arranged in the right position of the housing 101A is displayed in the corresponding cartridge display field SEc2 of the right cartridge display area CLc2. The cartridge object COb of the display image RI2*b* corresponding to the printer 100B where the mounting part 172B is arranged in the left position of the housing 101B is displayed in the corresponding cartridge display field SEc1 of the left cartridge display area CLc1.

The display images RI2*c* and RI2*d* corresponding to one-chamber supply method include one object Cc; Cd (cartridge object COc; COd), respectively, similar to the first example. The cartridge object COc of the display image RI2*c* corresponding to the printer 100C where the mounting part 172C is arranged in the left position of the housing 101C is displayed in the corresponding cartridge display field SEc1 of the left cartridge display area CLc1. The cartridge object COd of the display image RI2*d* corresponding to the printer 100D where the mounting part 172D is arranged in the right position of the housing 101D is displayed in the corresponding cartridge display field SEc2 of the right cartridge display area CLc2. The tank display fields SEt of the tank display area CLt corresponding to the display images RI2*a* and RI2*b* corresponding to one-chamber supply method are blank.

According to the second example described above, as described above, when the mounting part (for example, 172A) is provided at a first mounting position (for example, the right position) in the housing (for example, 101A), the management apparatus 300 sets a position where the area including the cartridge object (for example, COa) is arranged to a position (right position) on the second direction D2-side with respect to the tank display area CLt. When the mounting part (for example, 172B) is provided at a second mounting position (for example, the left position) in the housing (for example, 101B), the management apparatus 300 sets a position where the area including the cartridge object (for example, COb) is arranged to a position (left position) on the opposite side to the second direction-side with respect to the tank display area CLt. This allows the user to easily recognize the mounting positions of the ink cartridges 100A and 100B to the housing 101A and 101B because the arrangement of the cartridge display areas CLc1 and CLc2 and the tank display area CLt in the management screen WD corresponds to the mounting positions of the ink cartridges 100A and 100B to the housing 101A and 101B.

C. Third Example

In a third example, the printers 100A to 100D of management targets are color printers configured to execute printing with using a plurality of colors of inks Ik. For example, for the printers 100A to 100D, three-color inks Ik of C (cyan), M (magenta) and Y (yellow) are used.

Therefore, although not shown, in the third example, three ink cartridges 200A corresponding to the CMY inks Ik are mounted to the mounting part 172A of the printer 100A. The printers 100B to 100D are also the same.

Figure 13:
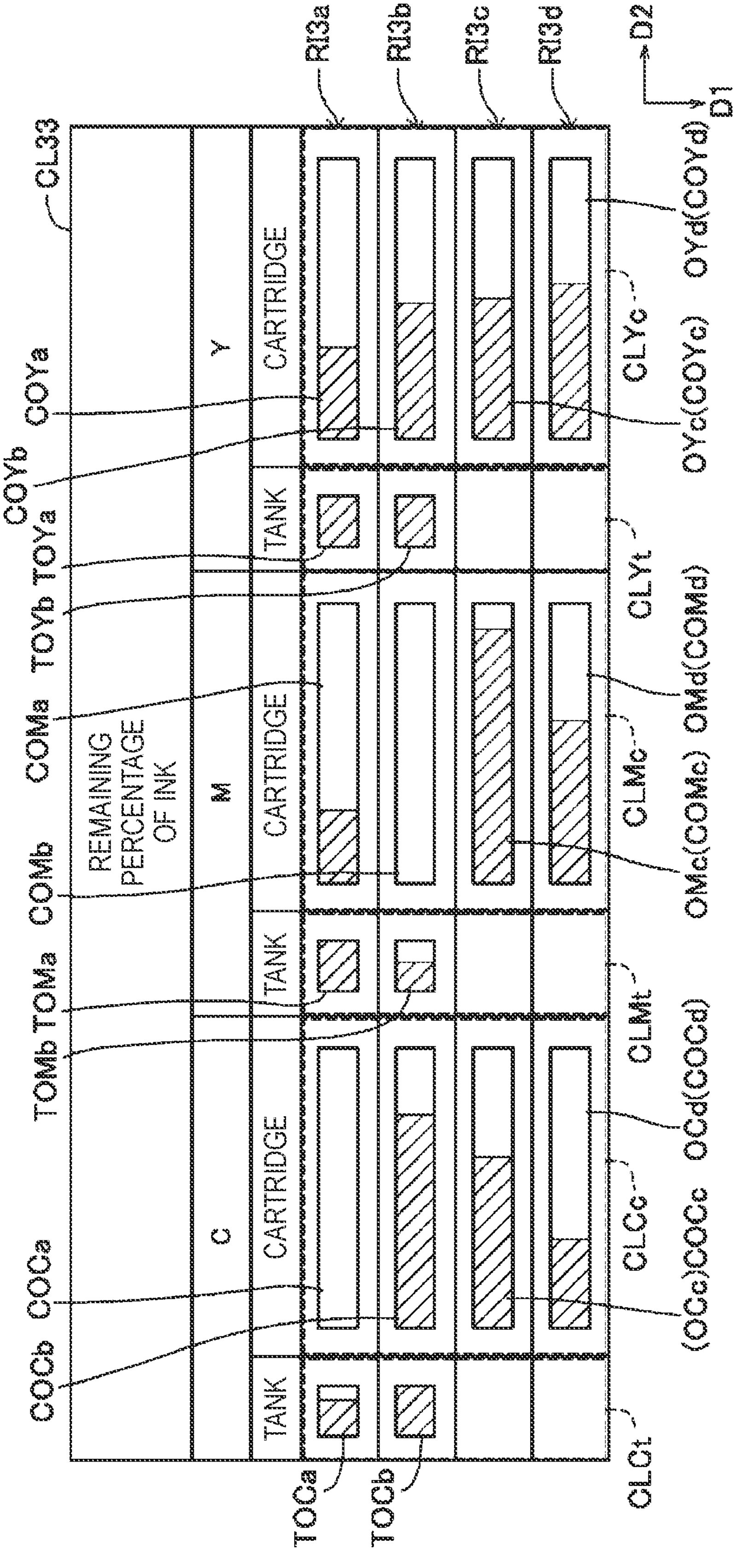
FIG. 13 shows an example of a display area CL33 of another example.

FIG. 13 shows an example of a display area CL33 of the third example. In the third example, a display area CL33 of FIG. 13 is displayed, instead of the display area CL3 (FIG. 7) of the management screen WD of the first example.

The display area CL33 includes, as the tank display area, three color-coded tank display areas CLCt, CLMt and CLYt corresponding to the three-color inks Ik. The display area CL33 includes, as the cartridge display area, three color-coded cartridge display areas CLCc. CLMc and CLYc corresponding to the three-color inks Ik. The color-coded tank display areas CLCt, CLMt and CLYt and the color-coded cartridge display areas CLCc, CLMc and CLYc each consist of a plurality of display fields aligned along the first direction D1. The color-coded tank display areas CLCt. CLMt and CLYt and the color-coded cartridge display areas CLCc, CLMc and CLYc are different from each other in terms of positions in the second direction D2.

The cyan color-coded tank display area CLCt is adjacent to the left side of the cyan color-coded cartridge display area CLCc. Similarly, the magenta color-coded tank display area CLMt is adjacent to the left side of the magenta color-coded cartridge display area CLMc, and the yellow color-coded tank display area CLYt is adjacent to the left side of the yellow color-coded cartridge display area CLYc. The magenta areas CLMt and CLMc of two columns are arranged on the right side of the cyan areas CLCt and CLCc of two columns, and the yellow areas CLYt and CLYc of two columns are arranged on the right side of the magenta areas CLMt and CLMc of two columns. Therefore, in the present example, the color-coded tank display areas CLCt. CLMt and CLYt and the color-coded cartridge display areas CLCc, CLMc and CLYc are alternately aligned along the second direction D2.

The display image RI3*a* corresponding to the two-chamber supply method includes three tank objects TOCa, TOMa and TOYa corresponding to the three-color inks, and three cartridge objects COCa, COMa and COYa corresponding to the three-color inks Ik. The three tank objects TOCa, TOMa and TOYa are respectively displayed in the display fields of the color-coded tank display areas CLCt. CLMt and CLYt of corresponding colors. The three cartridge objects COCa, COMa and COYa are respectively displayed in the display fields of the color-coded cartridge display areas CLCc, CLMc and CLYc of corresponding colors.

Similarly, the display image RI3*b* corresponding to the two-chamber supply method includes three tank objects TOCb, TOMb and TOYb corresponding to the three-color inks, and three cartridge objects COCb, COMb and COYb corresponding to the three-color inks Ik. The three tank objects TOCb. TOMb and TOYb are respectively displayed in the display fields of the color-coded tank display areas CLCt, CLMt and CLYt of corresponding colors. The three cartridge objects COCb. COMb and COYb are respectively displayed in the display fields of the color-coded cartridge display areas CLCc. CLMc and CLYc of corresponding colors.

The display image RI3*c* corresponding to one-chamber supply method includes three objects OCc, OMc and OYc (cartridge objects COCc, COMc and COYc) corresponding to the three-color inks Ik. The three objects OCc, OMc and OYc are displayed in the display fields of the color-coded cartridge display areas CLCc, CLMc and CLYc of corresponding colors.

The display image RI3*d* corresponding to one-chamber supply method includes three objects OCd. OMd and OYd (cartridge objects COCd, COMd and COYd) corresponding to the three-color inks Ik. The three objects OCd. OMd and OYd are displayed in the display fields of the color-coded cartridge display areas CLCc, CLMc and CLYc of corresponding colors.

The display fields of the color-coded tank display areas CLCt, CLMt and CLYt corresponding to the display images RI3*c* and RI3*d* corresponding to one-chamber supply method are all blank.

According to the third example described above, in each of the plurality of color-coded tank display areas CLCt, CLMt and CLYt, the tank objects TOCa, TOMa, TOYa. TOCb, TOMb and TOYb corresponding to one of the three-color inks Ik of CMY are displayed, and in each of the plurality of color-coded cartridge display areas CLCc. CLMc and CLYc, the cartridge objects COCa, COMa, COYa, COCb, COMb and COYb corresponding to one of the three-color inks Ik of CMY are displayed. As a result, even when the printer configured to execute printing with using the plurality of colors of inks Ik is a management target, it is possible to improve the convenience for the user of the management screen WD. For example, as for the object corresponding to the ink Ik of each color of CMY, it is possible to easily perceive whether the object indicates the remaining percentage of the ink Ik corresponding to the remaining state of the ink Ik in the ink cartridge or the remaining percentage of the ink Ik corresponding to the second storage state S2 of the second-chamber supply method.

D. Fourth Example

In a fourth example, similar to the third example, the printers 100A to 100D of management targets are color printers configured to execute printing with using a plurality of colors of inks Ik. For example, for the printers 100A to 100D, three-color inks Ik of C (cyan), M (magenta) and Y (yellow) are used.

Figure 14:
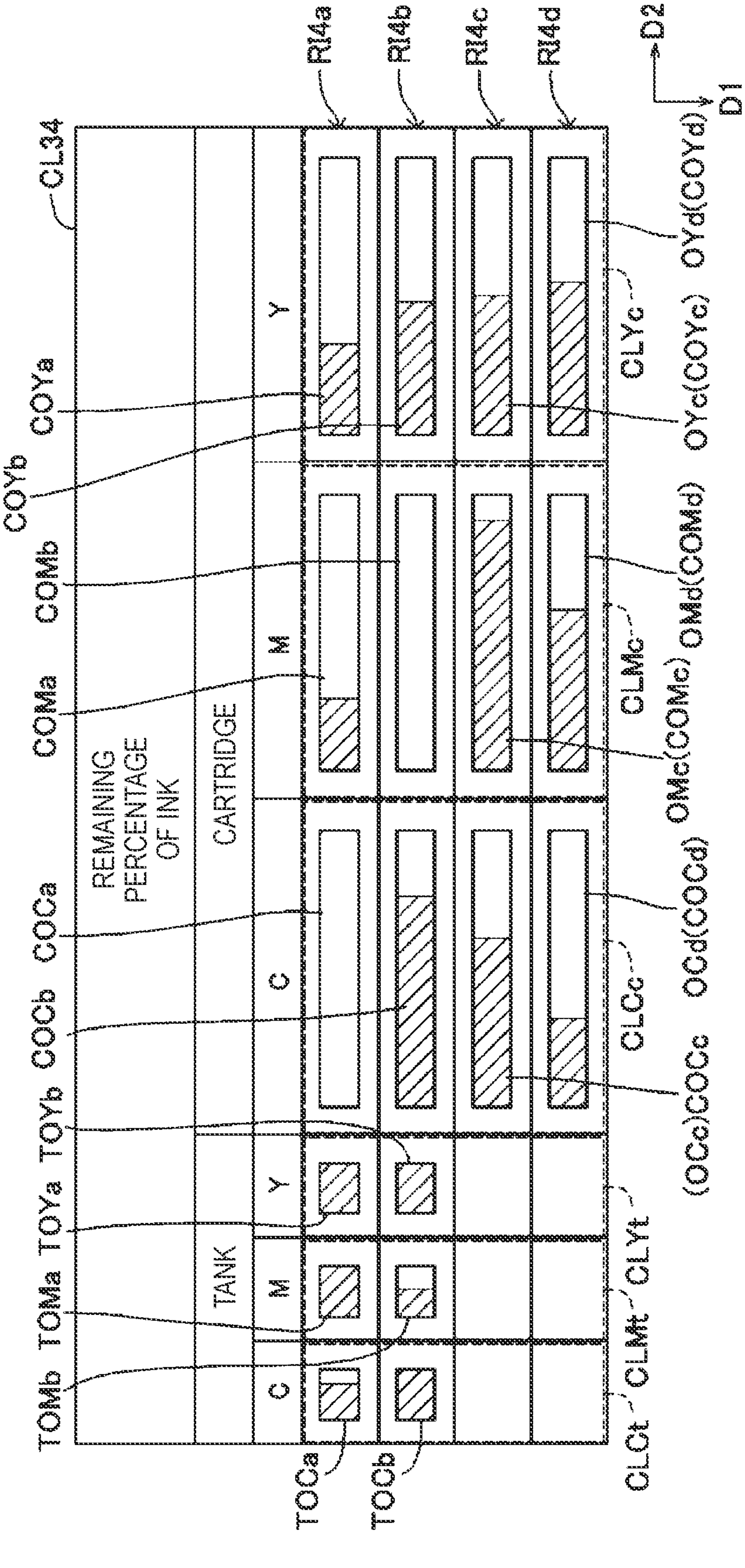
FIG. 14 shows an example of a display area CL34 of another example.

FIG. 14 shows an example of a display area CL34 of the fourth example. In the fourth example, a display area CL34 of FIG. 14 is displayed, instead of the display area CL3 (FIG. 7) of the management screen WD of the first example.

Similar to the display area CL33 in FIG. 13, the display area CL34 in FIG. 14 includes three color-coded tank display areas CLCt, CLMt and CLYt corresponding to the three-color inks Ik, and three color-coded cartridge display areas CLCc. CLMc and CLYc corresponding to the three-color inks Ik. The configurations of the display areas CLCt, CLMt, CLYt, CLCc, CLMc and CLYc, and the configurations of the objects displayed in these display areas are the same as the third example.

In the display area CL34 of the fourth example, an arrangement order of the display areas CLCt, CLMt, CLYt, CLCc, CLMc and CLYc along the second direction D2 is different from the display area CL33 of the third example. In the display area CL34 of the fourth example, the three color-coded tank display areas CLCt, CLMt and CLYt and the three color-coded cartridge display areas CLCc, CLMc and CLYc are aligned in corresponding order from an upstream side (the left side in FIG. 14) toward a downstream side (the right side in FIG. 14) with respect to the second direction D2. Specifically, the three color-coded tank display areas CLCt, CLMt and CLYt are collectively arranged on the upstream side with respect to the second direction D2, and the three color-coded cartridge display areas CLCc. CLMc and CLYc are collectively arranged on the downstream side with respect to the second direction D2.

In the fourth example described above, as described above, in the display area CL34 (FIG. 14), the plurality of color-coded tank display areas CLCt, CLMt and CLYt is arranged on the further upstream side than the plurality of color-coded cartridge display areas CLCc, CLMc and CLYc with respect to the second direction D2. As a result, since the color-coded tank display areas CLCt, CLMt and CLYt are collectively arranged, the visibility of the management screen WD is improved. For example, it is possible to easily perceive the intermediate tank remaining percentage SR of the printer of the two-chamber supply method in the second storage state S2.

E. Modified Examples (1) The configurations of the display areas CL3. CL32 to CL34 of the first to fourth examples are exemplary, and are modified as appropriate.

For example, the size in the length direction of each object in the above-described examples is fixed, and each object is divided into the variable area and the remaining area, thereby indicating the remaining percentage of the ink Ik (FIGS. 6A to 6C). Instead of this, each object may not be divided into the variable area and the remaining area, similar to the object (FIG. 8) of Comparative Example. In this case, the entire length of the object varies according to the remaining percentage of the ink Ik, and the entire length of the object indicates the remaining percentage of the ink Ik.

In addition, in the third example and the fourth example, in the display area CL33; CL34, the three color-coded tank display areas and the three color-coded cartridge display areas of CMY are arranged in the second direction D2. Instead of this, also in a case of managing a color printer, similar to the first example, in the display area CL33; CL34, one tank display area and one cartridge display area may be arranged. In this case, for example, the three tank objects of CMY corresponding to one printer of the two-chamber supply method are aligned along the first direction D1 (for example, along the vertical direction) in one tank display area. Also, the three cartridge objects of CMY corresponding to one printer are aligned along the first direction D1 in one cartridge display area.

Further, each object of each of the above-described examples is a band-shaped object extending in a linear shape but may also be a band-shaped object extending in a curve shape. For example, a band-shaped object extending in an arc shape is also possible. In this case, a position in the length direction, i.e., in a circumferential direction of the object corresponds to a value that can be taken by the index value pertaining to the remaining amount of the ink Ik.

Further, in the display area CL3 of FIG. 7, the cartridge display area CLc consists of the plurality of cartridge display fields SEc aligned in the vertical direction, and the tank display area CLt consists of the plurality of tank display fields SEt aligned in the vertical direction. Instead of this, the cartridge display area may consist of a plurality of cartridge display fields aligned in the lateral direction, and the tank display area may consist of a plurality of tank display fields aligned in the lateral direction. In this case, the plurality of display images RIa to RId is aligned in the lateral direction. The cartridge objects COa to COd of each display image are displayed in the corresponding cartridge display fields of the cartridge display area, and the tank objects TOa and TOb are arranged in the corresponding tank display fields of the tank display area. In this case, the lateral direction is an example of the first direction, and the vertical direction is an example of the second direction.

(2) The management screen display processing of FIG. 9 is exemplary and is changed as appropriate. For example, the function (S215 to S235 in FIG. 9) of setting the tank display area CLt to the non-display may be omitted. In addition, the sort function (S235 to S250 in FIG. 9) of changing the arrangement order of the display images may be all or partially omitted.

Further, the sort function of the management screen display processing of FIG. 9 includes the function of changing the arrangement order, based on the intermediate tank remaining percentage SR, and the function of changing the arrangement order, based on the cartridge remaining percentage CR. Instead of these functions or in addition to these functions, the sort function may include, for example, a function of changing the arrangement order, based on a sum of the remaining amounts of the ink Ik. Specifically, in the printer of the two-chamber supply method, the arrangement order may be changed based on a sum of the remaining amount of the ink Ik in the intermediate tank and the remaining amount of the ink Ik in the ink cartridge, and in the printer of one-chamber supply method, the arrangement order may be changed based on the remaining amount of the ink Ik in the ink cartridge. For example, the plurality of display images RIa to RId (FIG. 7) is sorted in ascending order or descending order of the sum of the remaining amounts of the ink Ik.

(3) In the display area CL32 (FIG. 12) of the second example, the cartridge display areas CLc1 and CLc2 are each arranged on both left and right sides of one tank display area CLt. Instead of this, one tank display area may be respectively arranged on both left and right sides of one cartridge display area. In this case, for example, the tank object of the display image corresponding to the printer 100B where the mounting part 172B of FIG. 12 is arranged in the left position of the housing 101B is displayed in the tank display area on the left side. The tank object of the display image corresponding to the printer 100A where the mounting part 172A is arranged in the right position of the housing 101A is displayed in the tank display area on the right side.

(4) In the first example, in the display area CL3 of the management screen WD, the display images RIa to Rid indicative of the remaining percentages of the ink Ik are displayed as an image displaying the index value pertaining to the remaining amount of the ink Ik. Instead of this, the display area may also be configured to display another index value pertaining to the remaining amount of the ink Ik. For example, as another index value, the number of remaining printable sheets RN may be displayed or the remaining amount itself of the ink Ik may be displayed. Also in this modified example, the management screen WD whereby the remaining amounts of the ink Ik in the printers 100A to 100D can be easily perceived is provided. The other examples are also similar, respectively.

(5) In the above-described examples, the printer of a processing target, for example, the printer 100A includes the inkjet-type print execution unit 160. Instead of this, the printer 100A may include an electrophotographic (for example, laser-type) printing mechanism configured to print an image with using toner as a printing material. In this case, the printer may include a supply unit to which a toner cartridge can be mounted, an intermediate tank (for example, a sub-tank in which toner is temporarily reserved) configured to store toner that is supplied from the toner cartridge mounted to the supply unit, and a print execution unit configured to execute printing with using the toner stored in the intermediate tank. Even in a case where the printer having a toner supply method of a two-chamber supply method is adopted, the management screen WD of the present example can be applied.

(6) In the above-described examples, the management apparatus 300 acquires the total number of printable sheets TN and the number of remaining printable sheets RN from the printers 100A to 100D to calculate the cartridge remaining percentage CR and the intermediate tank remaining percentage SR (S135 to S160 in FIG. 5). Instead of this, each printer may be configured to calculate the cartridge remaining percentage CR and the intermediate tank remaining percentage SR. In this case, the cartridge remaining percentage CR and the intermediate tank remaining percentage SR are stored in the information database IB of each printer. The management apparatus 300 may acquire the cartridge remaining percentage CR and the intermediate tank remaining percentage SR from each printer, in S110 of FIG. 5.

Further, the management apparatus 300 may be configured to store in advance the number of tank-printable sheets SN of each printer for each model of the printer. In this case, the management apparatus 300 may be configured to refer to the model name acquired from each printer to acquire the number of tank-printable sheets SN stored in advance. Similarly, the management apparatus 300 may be configured to store in advance the total number of printable sheets TN of the ink cartridge of each printer for each part number of the ink cartridge. In this case, the management apparatus 300 may be configured to refer to the part number of the ink cartridge acquired from each printer to acquire the total number of printable sheets TN stored in advance.

(7) The objects Oa to Od of the management screen WD of FIG. 7 are band-shaped objects extending in the lateral direction. Instead of this, for example, these objects may be objects having other shapes. For example, the object may be a band-shaped object extending in the vertical direction. In addition, for example, the object may be a plurality of circular objects, which is a plurality of circular objects aligned in a predetermined direction (for example, the vertical direction). In this case, for example, the cartridge remaining percentage CR and the intermediate tank remaining percentage SR may be indicated by the number of the circular objects.

(8) In the above-described examples, the output of the display screen data by the management apparatus 300 is performed in a form of displaying the management screen WD (FIG. 7) on the display unit 340 with using the display screen data. Instead of this, for example, the output of the display screen data by the management apparatus 300 may be performed in a form of transmitting the display screen data to a terminal device of the user (for example, a smart phone or a personal computer). In this case, for example, the management screen WD (FIG. 7) is displayed on a display unit of the terminal device.

(9) In the above-described examples, the screen data generating processing of FIG. 5 is executed by the management apparatus 300. Instead of this, each printer of a management target may be configured to execute the processing of S125 to S165 of FIG. 5 to generate display image data and to transmit the display image data to the management apparatus 300. The management apparatus 300 may be configured to generate display screen data indicative of the management screen WD with using the display image data acquired from each printer.

(10) The management apparatus 300 is connected to the local area network NT. However, the management apparatus 300 may also be connected to the Internet IT. In this case, for example, the printers 100A to 100D are each configured to transmit periodically and voluntarily the printer information to the management apparatus 300. The management apparatus 300 is configured to execute the screen data generating processing of FIG. 5 with using the printer information. The management apparatus 300 is configured to transmit screen data indicative of the management screen WD to the terminal device, in response to a request from the terminal device of the user, as described above. In this case, for example, the management apparatus 300 may be a so-called cloud server including a plurality of computing machines capable of communicating with each other via the network.

(11) In each of the above-described examples, some of the configurations implemented by hardware may be replaced with software, and to the contrary, some or all of the configurations implemented by software may be replaced with hardware.

(12) In a case where some or all of the functions of the present disclosure are implemented by a computer program, the program may be provided in a form of being stored in a computer-readable recording medium (for example, a non-transient recording medium). The program may be used in a state of being stored in a recording medium (computer-readable recording medium) that is the same as or different from the recording medium at the time of provision. The 'computer-readable recording medium' is not limited to a portable recording medium such as a memory card and a CD-ROM, and may include an internal storage device in a computer, such as various ROMs, and an external storage device connected to the computer, such as a hard disk drive.

Although the present disclosure has been described based on the examples and the modified examples, the examples of the present disclosure are to easily understand the present invention, not to limit the present disclosure. The present disclosure can be changed and improved without departing from the gist and the claims, and equivalents thereof are included in the present disclosure.

What is claimed is:

1. A non-transitory computer-readable storage medium storing a computer program, when executed by a computer, the computer program being configured to cause the computer to perform:

acquiring first information pertaining to a remaining amount of a first printing material in a first cartridge which is mounted to a first supply unit configured to supply the first printing material to a first print execution unit, the first supply unit having a tank configured to store the first printing material supplied from the first cartridge mounted to the first supply unit, and being configured to supply the first printing material stored in the tank to the first print execution unit;

acquiring second information pertaining to a remaining amount of a second printing material in a second cartridge which is mounted to a second supply unit configured to supply the second printing material to a second print execution unit, the second supply unit not having the tank;

generating display screen data indicating a display screen including a first display image for displaying a first value determined using the first information and a second display image for displaying a second value determined using the second information, the first value being an index value pertaining to the remaining amount of the first printing material, and the second value being an index value pertaining to the remaining amount of the second printing material; and outputting the display screen data, wherein the first display image includes a first object and a second object, the first object indicates a value, which corresponds to a first state where the first printing material remains in the first cartridge and the first printing material remains in the tank, out of values which enable to be taken by the first value, the second object indicates a value, which corresponds to a second state where the first printing material does not remain in the first cartridge and the first printing material remains in the tank, out of the values which enable to be taken by the first value, the second display image includes a third object, the third object indicates the second value corresponding to a state where the second printing material remains in the second cartridge, the display screen includes a first area having a plurality of display fields aligned along a first direction which is one of a lateral direction and a vertical direction, and a second area different from the first area in terms of position in a second direction which is the other of the lateral direction and the vertical direction and having a plurality of display fields aligned along the first direction, the first object is displayed in a display field, which corresponds to the first print execution unit, in the first area, the second object is displayed in a display field, which corresponds to the first print execution unit, in the second area, and the third object is displayed in a display field, which corresponds to the second print execution unit, in the first area.

2. The non-transitory computer-readable storage medium according to claim 1, wherein a display field, which corresponds to the second print execution unit, in the second area is blank.

3. The non-transitory computer-readable storage medium according to claim 1, wherein the display screen includes a plurality of display images including two or more of the first display images and two or more of the second display images, the plurality of display images being aligned along the first direction, and in a case where the computer program causes the computer to generate the display screen data, the computer program is configured to cause the computer to perform sorting, in the display screen, the plurality of display images based on at least one of the first value and the second value corresponding to the plurality of display images.

4. The non-transitory computer-readable storage medium according to claim 3, wherein in a case where the computer program causes the computer to sort the plurality of display images, the computer program is configured to cause the computer to sort the plurality of display images in order of prioritizing the two or more first display images over the two or more second display images or in order of prioritizing the two or more second display images over the two or more first display images.

5. The non-transitory computer-readable storage medium according to claim 1, wherein in a case where the computer program causes the computer to generate the display screen data, the computer program is configured to cause the computer to perform switching between display and non-display of the second area in the display screen based on a user's instruction.

6. The non-transitory computer-readable storage medium according to claim 1, wherein the first print execution unit is configured to execute printing with using a plurality of colors of the first printing materials, a plurality of the first cartridges corresponding to the plurality of colors of the first printing materials are mounted to the first supply unit, the first area has a plurality of first color-coded areas whose positions in the second direction are different from each other, the second area has a plurality of second color-coded areas whose positions in the second direction are different from each other, the first object corresponding to one of the plurality of colors of the first printing materials is displayed in each of the plurality of first color-coded areas, and the second object corresponding to one of the plurality of colors of the first printing materials is displayed in each of the plurality of second color-coded areas.

7. The non-transitory computer-readable storage medium according to claim 6, wherein the plurality of second color-coded areas are arranged on a further upstream side or downstream side than the plurality of first color-coded areas with respect to the second direction in the display screen.

8. The non-transitory computer-readable storage medium according to claim 1, wherein in a case where the computer program causes the computer to generate the display screen data, the computer program is configured to cause the computer to perform switching a position where the first area is arranged between a position on the second direction-side with respect to the second area and a position on an opposite side to the second direction with respect to the second area.

9. The non-transitory computer-readable storage medium according to claim 8, wherein in a case where the computer program causes the computer to switch the position where the first area is arranged, the computer program is configured to cause the computer to:

set the position where the first area is arranged to the position on the second direction-side with respect to the second area in a case where the first cartridge is mounted to a first mounting position in a housing configured to accommodate the first print execution unit and the first supply unit; and set the position where the first area is arranged to the position on the opposite side to the second direction-side with respect to the second area in a case where the first cartridge is mounted to a second mounting position in the housing configured to accommodate the first print execution unit and the first supply unit.

10. The non-transitory computer-readable storage medium according to claim 1, wherein the first direction is the vertical direction, and the second direction is the lateral direction.

11. A management apparatus for a plurality of print execution units, the management apparatus comprising:

a first acquisition unit configured to acquire first information pertaining to a remaining amount of a first printing material in a first cartridge which is mounted to a first supply unit configured to supply the first printing material to a first print execution unit, the first supply unit having a tank configured to store the first printing material supplied from the first cartridge mounted to the first supply unit, and being configured to supply the first printing material stored in the tank to the first print execution unit;

a second acquisition unit configured to acquire second information pertaining to a remaining amount of a second printing material in a second cartridge which is mounted to a second supply unit configured to supply the second printing material to a second print execution unit, the second supply unit not having the tank;

a generation unit configured to generate display screen data including a first display image for displaying a first value determined using the first information and a second display image for displaying a second value determined using the second information, the first value being an index value pertaining to the remaining amount of the first printing material, and the second value being an index value pertaining to the remaining amount of the second printing material, wherein the first display image includes a first object and a second object, the first object indicates a value, which corresponds to a first state where the first printing material remains in the first cartridge and the first printing material remains in the tank, out of values which enables to be taken by the first value, the second object indicates a value, which corresponds to a second state where the first printing material does not remain in the first cartridge and the first printing material remains in the tank, out of the values which enables to be taken by the first value, the second display image includes a third object, the third object indicates the second value corresponding to a state where the second printing material remains in the second cartridge, the display screen includes a first area having a plurality of display fields aligned along a first direction, which is one of a lateral direction and a vertical direction, and a second area different from the first area in terms of position in a second direction, which is the other of the lateral direction and the vertical direction, and having a plurality of display fields aligned along the first direction, the first object is displayed in a display field, which corresponds to the first print execution unit, in the first area, the second object is displayed in a display field, which corresponds to the first print execution unit, in the second area, and the third object is displayed in a display field, which corresponds to the second print execution unit, in the first area; and an output unit configured to output the display screen data.

12. A management method for a plurality of print execution units, the management method comprising:

a first acquisition step of acquiring first information pertaining to a remaining amount of a first printing material of a first cartridge which is mounted to a first supply unit configured to supply the first printing material to a first print execution unit, the first supply unit having a tank configured to store the first printing material supplied from the first cartridge mounted to the first supply unit, and being configured to supply the first printing material stored in the tank to the first print execution unit;

a second acquisition step of acquiring second information pertaining to a remaining amount of a second printing material of a second cartridge which is mounted to a second supply unit configured to supply the second printing material to a second print execution unit, the second supply unit not having the tank;

a generation step of generating display screen data indicating a display screen including a first display image for displaying a first value determined using the first information and a second display image for displaying a second value determined using the second information, the first value being an index value pertaining to the remaining amount of the first printing material and the second value being an index value pertaining to the remaining amount of the second printing material; and an output step of outputting the display screen data, wherein the first display image includes a first object and a second object, the first object indicates a value, which corresponds to a first state where the first printing material remains in the first cartridge and the first printing material remains in the tank, out of values which enable to be taken by the first value, the second object indicates a value, which corresponds to a second state where the first printing material does not remain in the first cartridge and the first printing material remains in the tank, out of the values which enable to be taken by the first value, the second display image includes a third object, the third object indicates the second value corresponding to a state where the second printing material remains in the second cartridge, the display screen includes a first area having a plurality of display fields aligned along a first direction which is one of a lateral direction and a vertical direction, and a second area different from the first area in terms of position in a second direction, which is the other of the lateral direction and the vertical direction, and having a plurality of display fields aligned along the first direction, the first object is displayed in a display field, which corresponds to the first print execution unit, in the first area, the second object is displayed in a display field, which corresponds to the first print execution unit, in the second area, and the third object is displayed in a display field, which corresponds to the second print execution unit, in the first area.

* * * * *